US012687656B2

(12) United States Patent
Ishiguro

(10) Patent No.: US 12,687,656 B2
(45) Date of Patent: Jul. 21, 2026

(54) LAMINATE, DISPLAY DEVICE, AUTOMOBILE, AND PORTABLE ELECTRONIC DEVICE

(71) Applicant: FUJIFILM Corporation, Tokyo (JP)

(72) Inventor: Makoto Ishiguro, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 212 days.

(21) Appl. No.: 18/592,086

(22) Filed: Feb. 29, 2024

(65) Prior Publication Data

US 2024/0219605 A1 Jul. 4, 2024

Related U.S. Application Data

(63) Continuation of application No. PCT/JP2022/028480, filed on Jul. 22, 2022.

(30) Foreign Application Priority Data

Sep. 3, 2021 (JP) ................................ 2021-143876

(51) Int. Cl.
*G02B 1/00* (2006.01)
*G02B 1/04* (2006.01)
(Continued)

(52) U.S. Cl.
CPC .................. *G02B 1/04* (2013.01); *G02B 1/11* (2013.01); *G02B 1/18* (2015.01); *G02B 5/003* (2013.01);
(Continued)

(58) Field of Classification Search
CPC ........ G02B 5/208; G02B 1/022; G02B 1/105; G02B 5/22; G02B 1/04; G02B 1/11;
(Continued)

(56) References Cited

U.S. PATENT DOCUMENTS

2016/0291225 A1 10/2016 Sato et al.
2019/0196245 A1 6/2019 Ichihara et al.
(Continued)

FOREIGN PATENT DOCUMENTS

CN 105940329 A 9/2016
CN 105960603 A 9/2016
(Continued)

OTHER PUBLICATIONS

International Preliminary Report on Patentability and Written Opinion of the International Searching Authority for International Application No. PCT/JP2022/028480, dated Mar. 14, 2024, with an English translation.

(Continued)

*Primary Examiner* — Henry Duong
(74) *Attorney, Agent, or Firm* — Birch, Stewart, Kolasch & Birch, LLP

(57) ABSTRACT

Provided are a laminate having a decorative layer and having excellent light resistance, and a display device, an automobile, and a portable electronic device using the laminate. A laminate includes: a λ/4 retardation layer, a decorative layer including a cholesteric liquid crystal layer, and an ultraviolet absorbing layer in this order, in which the laminate has an oxygen blocking layer on a side of the ultraviolet absorbing layer with respect to the decorative layer.

20 Claims, 4 Drawing Sheets

(51) Int. Cl.
*G02B 1/11* (2015.01)
*G02B 1/18* (2015.01)
*G02B 5/00* (2006.01)
*G02B 5/30* (2006.01)
*G06F 1/16* (2006.01)

(52) U.S. Cl.
CPC ......... *G02B 5/3083* (2013.01); *G06F 1/1637* (2013.01)

(58) Field of Classification Search
CPC ........ G02B 1/18; G02B 5/003; G02B 5/3083; G02B 5/30; G02B 5/3016; G03F 7/70241; G06F 1/1637; B32B 27/00; B32B 27/18; G02F 1/1333; G02F 1/1335; G02F 1/13363; H05B 33/02; H05B 33/14
USPC .......................................................... 359/350
See application file for complete search history.

(56) References Cited

U.S. PATENT DOCUMENTS

| | | | | |
|---|---|---|---|---|
| 2020/0201060 | A1 | 6/2020 | Inada et al. | |
| 2021/0070022 | A1 | 3/2021 | Aridomi et al. | |
| 2021/0173135 | A1 | 6/2021 | Shibata et al. | |
| 2022/0119687 | A1 * | 4/2022 | Shibata | C09J 7/385 |

FOREIGN PATENT DOCUMENTS

| | | | |
|---|---|---|---|
| CN | 112654903 | A | 4/2021 |
| CN | 113272690 | A | 8/2021 |
| JP | 2003-118045 | A | 4/2003 |
| JP | 2005-128520 | A | 5/2005 |
| JP | 2018-161815 | A | 10/2018 |
| JP | 2018-199317 | A | 12/2018 |
| JP | 2019-204084 | A | 11/2019 |
| JP | 2020-38246 | A | 3/2020 |
| JP | 6744415 | B2 | 8/2020 |
| WO | WO 2018/043678 | A1 | 3/2018 |
| WO | WO 2019/049606 | A1 | 3/2019 |
| WO | WO 2020/008961 | A1 | 1/2020 |
| WO | WO 2021/006046 | A1 | 1/2021 |

OTHER PUBLICATIONS

International Search Report for International Application No. PCT/JP2022/028480, dated Oct. 11, 2022, with English translation.

Chinese Office Action and Search Report for corresponding Chinese Application No. 202280058728.2, dated Sep. 25, 2025, with English translation.

Automotive Electronics Juvenile, published Aug. 31, 1985; Volume No. 1-12; pp. 288-289.

Chinese Office Action (2nd) for corresponding Chinese Application No. 202280058728.2, dated May 13, 2026, with English translation.

* cited by examiner

LAMINATE, DISPLAY DEVICE, AUTOMOBILE, AND PORTABLE ELECTRONIC DEVICE

CROSS-REFERENCE TO RELATED APPLICATIONS

This application is a Continuation of PCT International Application No. PCT/JP2022/028480 filed on Jul. 22, 2022, which claims priority under 35 U.S.C. § 119(a) to Japanese Patent Application No. 2021-143876 filed on Sep. 3, 2021. The above applications are hereby expressly incorporated by reference, in their entirety, into the present application.

BACKGROUND OF THE INVENTION

1. Field of the Invention

The present invention relates to a laminate, a display device, an automobile, and a portable electronic device.

2. Description of the Related Art

In order to decorate the surface of home electric appliances, office equipment, automobile components, and the like, a laminate including a decorative layer is used. Use of a laminate having a decorative layer including a cholesteric liquid crystal layer as such a laminate has been studied. The cholesteric liquid crystal layer is obtained by immobilizing a cholesteric liquid crystal phase, and is known as a layer having a property of selectively reflecting any one of right circularly polarized light or left circularly polarized light in a specific wavelength range.

For example, JP6744415B discloses a decorative sheet having a cholesteric liquid crystal layer and satisfying a predetermined relationship of reflectance.

SUMMARY OF THE INVENTION

The inventor of the present invention has studied a laminate having a decorative layer including a cholesteric liquid crystal layer as described in JP6744415B, and has found that it is necessary to further improve light resistance (durability against light) of the laminate in applications where the laminate is assumed to be often placed in a bright room environment. A display mounted on an automobile, such as an in-vehicle display, a display installed in a living room or the like, a portable electronic device, and the like are placed in a bright room environment for a long time. Therefore, it has been found that it is necessary to further improve the light resistance of a laminate having a decorative layer used for these.

Therefore, an object of the present invention is to provide a laminate having a decorative layer and having excellent light resistance, and a display device, an automobile, and a portable electronic device using the laminate.

That is, the inventor of the present invention has found that the above-described object can be achieved by the following configurations.

[1] A laminate comprising, in the following order:

a λ/4 retardation layer;

a decorative layer including a cholesteric liquid crystal layer; and an ultraviolet absorbing layer, wherein the laminate includes an oxygen blocking layer on a side of the ultraviolet absorbing layer with respect to the decorative layer.

[2] The laminate according to [1], wherein the oxygen blocking layer contains a polyvinyl alcohol-based resin or a polyethylene vinyl alcohol-based resin.

[3] The laminate according to [2], wherein the polyvinyl alcohol-based resin and the polyethylene vinyl alcohol-based resin have a degree of saponification of 83% or more.

[4] The laminate according to any one of [1] to [3], wherein the ultraviolet absorbing layer has a transmittance of less than 10% at a wavelength of 380 nm.

[5] The laminate according to any one of [1] to [4], further comprising:

a low-moisture permeable layer on a side of the ultraviolet absorbing layer with respect to the decorative layer, wherein the low-moisture permeable layer has a moisture permeability of 40 g/($m^2$×day) or less at a temperature of 40° C. and a relative humidity of 90%, and the low-moisture permeable layer is provided at a position farther from the decorative layer than the oxygen blocking layer.

[6] The laminate according to any one of [1] to [5], further comprising:

a polarizer on the λ/4 retardation layer on a side opposite to the decorative layer.

[7] The laminate according to any one of [1] to [6], further comprising:

at least one of an antireflection layer, a non-glossy layer, or a tactile sensation imparting layer on an outermost surface of the laminate.

[8] A display device comprising:

a display element; and the laminate according to any one of [1] to [7] disposed on a side of a display surface of the display element.

[9] The display device according to [8], which is a liquid crystal display device or an electroluminescent display device.

[10] An automobile comprising:

the laminate according to any one of [1] to [7] or the display device according to [8] or [9].

[11] A portable electronic device comprising:

the laminate according to any one of [1] to [7] or the display device according to [8] or [9].

According to the present invention, it is possible to provide a laminate having a decorative layer and having excellent light resistance, and a display device, an automobile, and a portable electronic device using the laminate.

DESCRIPTION OF THE PREFERRED EMBODIMENTS

Hereinafter, the present invention will be described in detail.

Although requirements to be described below are described based on representative embodiments of the present invention, the present invention is not limited to the embodiments.

In the present specification, a numerical range expressed using "to" means a range including numerical values described before and after "to" as a lower limit value and an upper limit value.

In addition, in the present specification, the term "liquid crystal composition" and "liquid crystal compound" include ones that no longer exhibit liquid crystallinity due to curing or the like.

[Laminate and Display Device]

The laminate according to an embodiment of the present invention comprises: a λ/4 retardation layer; a decorative layer including a cholesteric liquid crystal layer; and an ultraviolet absorbing layer in this order, wherein the laminate has an oxygen blocking layer on a side of the ultraviolet absorbing layer with respect to the decorative layer.

In addition, the display device according to an embodiment of the present invention comprises: a display element; and the above-described laminate disposed on a side of a display surface of the display element.

Figure 1:
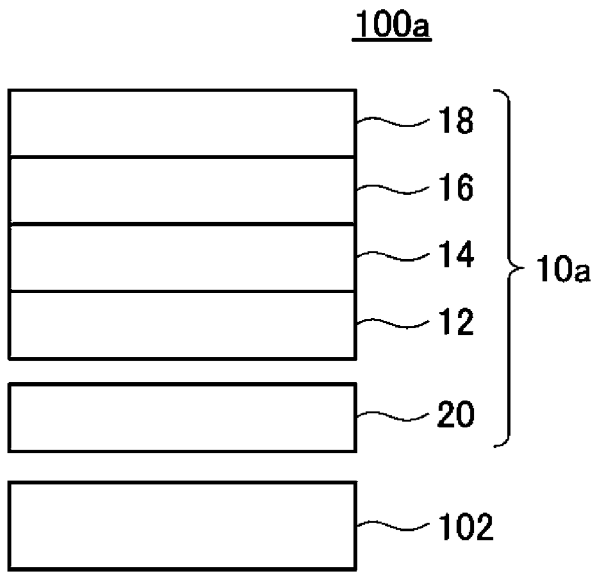
FIG. 1 is a view conceptually showing a display device having an example of the laminate according to an embodiment of the present invention.

FIG. 1 is a view conceptually showing a display device having an example of the laminate according to an embodiment of the present invention.

A display device 100*a* shown in FIG. 1 has a display element 102, and a laminate 10*a* disposed on a side of the display surface of the display element 102. In addition, the laminate 10*a* has a polarizer 20, a λ/4 retardation layer 12, a decorative layer 14, an oxygen blocking layer 16, and an ultraviolet absorbing layer 18 in this order from the display element 102 side.

In the following description, an upper side in the drawing is referred to as an upper side, and a lower side in the drawing is referred to as a lower side. In addition, in the laminate 10*a*, a side opposite to the display element 102 is also referred to as a viewing side.

The decorative layer 14 includes a cholesteric liquid crystal layer. As well known, the cholesteric liquid crystal layer has wavelength selective reflectivity. Therefore, by adjusting the selective reflection wavelength of the cholesteric liquid crystal layer, an optional color appearance can be imparted to the decorative layer 14.

Here, as described above, the inventor of the present invention has studied a laminate having a decorative layer including a cholesteric liquid crystal layer, and has found that it is necessary to further improve light resistance of the laminate in applications where the laminate is assumed to be often placed in a bright room environment for a long time, such as a display mounted on an automobile such as an in-vehicle display, a display installed in a living room or the like, and a portable electronic device. Specifically, when the decorative layer is irradiated with light, particularly ultraviolet rays, liquid crystal molecules in the cholesteric liquid crystal layer which is the decorative layer are cut by the light (ultraviolet rays). As a result, the wavelength selective reflectivity of the cholesteric liquid crystal layer is impaired, and the decorative layer deteriorates.

In light of this, in order to block ultraviolet rays radiated onto the decorative layer, it is considered to dispose an ultraviolet absorbing layer on the viewing side of the decorative layer. However, according to the study of the inventor of the present invention, it has been found that merely providing the ultraviolet absorbing layer is insufficient. Specifically, in a case where oxygen enters the cholesteric liquid crystal layer, liquid crystal molecules in the cholesteric liquid crystal layer are easily cut by light. The inventor of the present invention thus has found that, even in a case where the ultraviolet absorbing layer is provided, the liquid crystal molecules are cut by light, the wavelength selective reflectivity of the cholesteric liquid crystal layer is impaired, and the decorative layer deteriorates.

Therefore, the laminate 10*a* according to an embodiment of the present invention has the oxygen blocking layer 16 and the ultraviolet absorbing layer 18 on the viewing side of the decorative layer 14. By providing the ultraviolet absorbing layer 18 on the viewing side of the decorative layer 14, ultraviolet rays are suppressed from reaching the decorative layer 14. In addition, by providing the oxygen blocking layer 16 on the viewing side of the decorative layer 14, oxygen is suppressed from reaching the decorative layer 14. As a result, it is possible to suppress that the liquid crystal molecules in the cholesteric liquid crystal layer which is the decorative layer are cut by ultraviolet rays and/or oxygen, the wavelength selective reflectivity of the cholesteric liquid crystal layer is impaired, and the decorative layer deteriorates.

Here, in an embodiment of the present invention, the oxygen blocking layer is a layer having an oxygen permeability of 120 cc/($m^2$×day×atm) or less. The oxygen permeability is an index indicating an amount of oxygen passing through a layer per unit time and unit area. In an embodiment of the present invention, a value measured by an oxygen concentration device (for example, MODEL3600, manufactured by Hack Ultra Analytical) in an environment of 25° C. and a relative humidity of 50% is employed for the oxygen permeability.

From the viewpoint of further improving light resistance, the oxygen permeability of the oxygen blocking layer is preferably 30 cc/($m^2$×day×atm) or less, more preferably 10 cc/($m^2$×day×atm) or less, and still more preferably 5 cc/($m^2$×day×atm) or less. The lower limit of the oxygen permeability is not particularly limited, but is 0.01 cc/($m^2$×day×atm) or more in many cases.

The oxygen blocking layer will be described in detail later.

In addition, in an embodiment of the present invention, it is preferable that the laminate has a low-moisture permeable layer on a side of the ultraviolet absorbing layer with respect to the decorative layer, and the low-moisture permeable layer is provided at a position (viewing side) farther from the decorative layer than the oxygen blocking layer. That is, the oxygen blocking layer and the low-moisture permeable layer are preferably disposed in this order from the decorative layer side.

Figure 2:
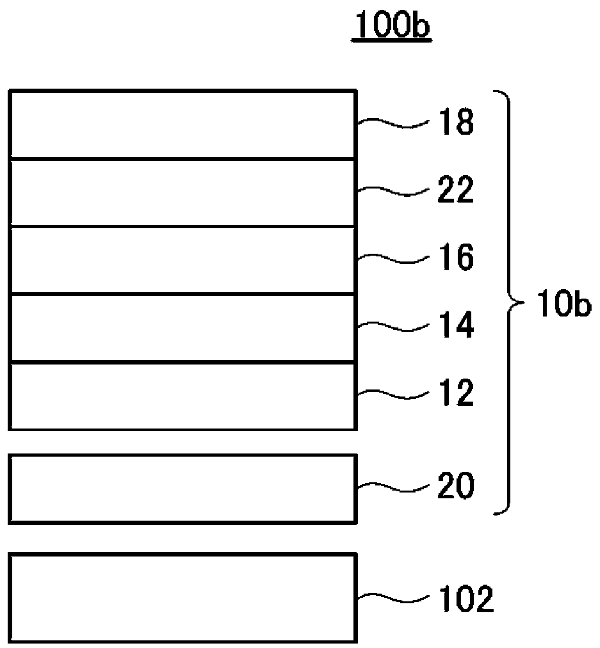
FIG. 2 is a view conceptually showing a display device having another example of the laminate according to an embodiment of the present invention.
Figure 3:
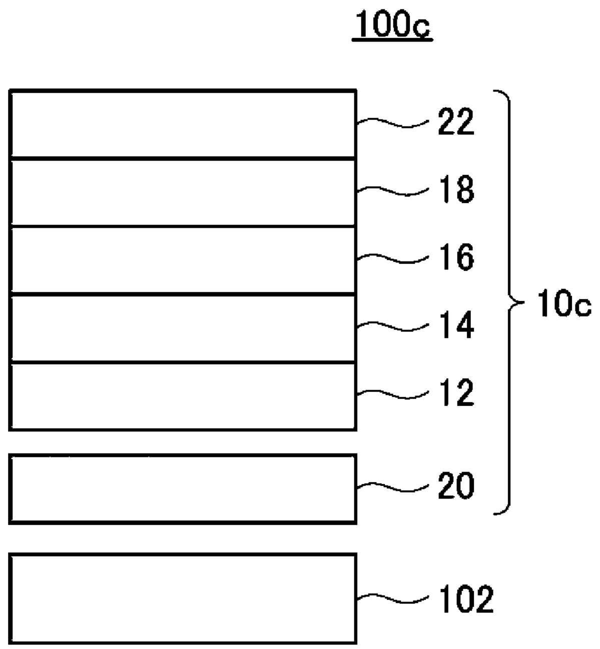
FIG. 3 is a view conceptually showing a display device having another example of the laminate according to an embodiment of the present invention.
Figure 4:
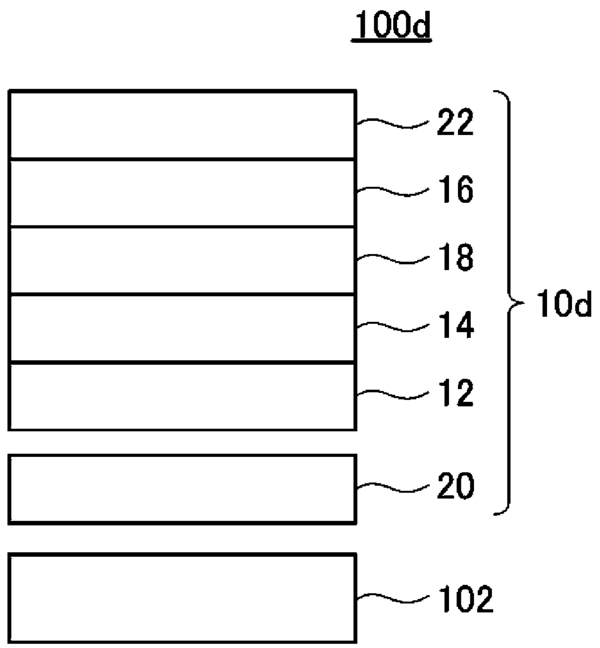
FIG. 4 is a view conceptually showing a display device having another example of the laminate according to an embodiment of the present invention.

FIGS. 2 to 4 are views conceptually showing a display device having another example of the laminate according to an embodiment of the present invention.

A display device 100*b* shown in FIG. 2 has the display element 102 and a laminate 10*b* disposed on a side of the display surface of the display element 102. The laminate 10*b* has the polarizer 20, the λ/4 retardation layer 12, the decorative layer 14, the oxygen blocking layer 16, a low-moisture permeable layer 22, and the ultraviolet absorbing layer 18 in this order from the display element 102 side.

A display device 100*c* shown in FIG. 3 has the display element 102 and a laminate 10*c* disposed on a side of the display surface of the display element 102. The laminate 10*c* has the polarizer 20, the λ/4 retardation layer 12, the decorative layer 14, the oxygen blocking layer 16, the ultraviolet absorbing layer 18, and the low-moisture permeable layer 22 in this order from the display element 102 side.

A display device 100*d* shown in FIG. 4 has the display element 102 and a laminate 10*d* disposed on a side of the display surface of the display element 102. The laminate 10*d* has the polarizer 20, the λ/4 retardation layer 12, the decorative layer 14, the ultraviolet absorbing layer 18, the oxygen blocking layer 16, and the low-moisture permeable layer 22 in this order from the display element 102 side.

It can be said that the laminates shown in FIGS. 2 to 4 have the same configuration except that the arrangement position of the ultraviolet absorbing layer 18 is different.

By providing the low-moisture permeable layer, liquid crystal molecules are suppressed from being cut by moisture in the cholesteric liquid crystal layer, so that water resistance and humidity durability can be improved. Further, according to the study of the inventor of the present invention, it was found that, by providing the low-moisture permeable layer 22 at a position closer to the viewing side than the oxygen blocking layer 16, as in the laminates shown in FIGS. 2 to 4, light resistance can also be improved.

In an embodiment of the present invention, the low-moisture permeable layer is a layer having a moisture permeability of 40 g/($m^2$×day) or less. The moisture permeability is a value converted into the weight (g) of water vapor passing through a sample having an area of 1 $m^2$ in an atmosphere of a temperature of 40° C. and a relative humidity of 90% over 24 hours, in accordance with the moisture permeability test (cup method) specified in JIS Z0208.

From the viewpoint of further improving water resistance, the moisture permeability of the low-moisture permeable layer is preferably 0 to 40 g/($m^2$×day), more preferably 0 to 25 g/($m^2$×day), and still more preferably 1 to 10 g/($m^2$×day).

The low-moisture permeable layer will be described in detail later.

Hereinafter, each component constituting the laminate and the display device according to an embodiment of the present invention will be described.

[Decorative Layer]

The decorative layer is a layer including a cholesteric liquid crystal layer. The decorative layer is not limited to a configuration having one cholesteric liquid crystal layer, and may have a configuration having two or more cholesteric liquid crystal layers. The decorative layer may also have a layer other than the cholesteric liquid crystal layer, for example, an alignment film used for aligning liquid crystal molecules in the formation of the cholesteric liquid crystal layer, a support, and the like.

<Cholesteric Liquid Crystal Layer>

The cholesteric liquid crystal layer means a layer in which a cholesteric liquid crystal phase is immobilized.

The cholesteric liquid crystal layer may be a layer in which the alignment of liquid crystal compounds forming the cholesteric liquid crystal phase is maintained. For example, the cholesteric liquid crystal layer is preferably a layer obtained by aligning polymerizable liquid crystal compounds to form an alignment state of a cholesteric liquid crystal phase, then polymerizing the polymerizable liquid crystal compounds by ultraviolet irradiation, heating, or the like, and curing the polymerizable liquid crystal compounds. The cholesteric liquid crystal layer is preferably a layer that has no fluidity and has been changed to a state where the alignment state is not changed by an external field or an external force.

Further, in the cholesteric liquid crystal layer, it is sufficient that the optical properties of the cholesteric liquid crystal phase are retained in the layer, and the liquid crystal compound in the layer need not exhibit liquid crystallinity any longer. For example, the polymerizable liquid crystal compound may have a high molecular weight by a curing reaction and lose its liquid crystallinity.

The cholesteric liquid crystal phase is known to exhibit selective reflectivity in a specific wavelength.

The center wavelength of the selective reflection (selective reflection center wavelength) λ of a general cholesteric liquid crystal phase depends on the helical pitch in the cholesteric liquid crystal phase. The selective reflection center wavelength λ complies with a relationship of $\lambda = n \times P$ where n is the average refractive index of the cholesteric liquid crystal phase. Therefore, the selective reflection center wavelength can be adjusted by adjusting the helical pitch.

The selective reflection center wavelength of the cholesteric liquid crystal phase increases as the helical pitch increases.

The helical pitch is one pitch (helical period) of the helical structure of the cholesteric liquid crystal phase, in other words, one turn of the helix. That is, the helical pitch is a length in the helical axis direction in which the director (the long axis direction in the case of a rod-like liquid crystal) of the liquid crystal compound constituting the cholesteric liquid crystal phase rotates by 360°.

The helical pitch of the cholesteric liquid crystal phase depends on the type and concentration of a chiral agent used together with the liquid crystal compound in the formation of the cholesteric liquid crystal layer. Therefore, a desired helical pitch can be obtained by adjusting these conditions.

The adjustment of the pitch is described in detail in Fuji Film Research & Development No. 50 (2005), p. 60 to 63. As a method for measuring the sense and the pitch of the helix, the methods described in "Introduction to Experimental Liquid Crystal Chemistry", edited by The Japanese Liquid Crystal Society, Sigma Publishing Co., Ltd., published in 2007, p. 46, and "Liquid Crystal Handbook", the Editing Committee of Liquid Crystal Handbook, Maruzen Publishing Co., Ltd., p. 196 can be used.

In addition, the cholesteric liquid crystal phase exhibits selective reflectivity with respect to either left or right circularly polarized light in a specific wavelength. Whether the reflected light is right circularly polarized light or left circularly polarized light depends on the helical twisted direction (sense) of the cholesteric liquid crystal phase. Regarding the selective reflection of the circularly polarized light by the cholesteric liquid crystal phase, in a case where the helical twisted direction of the cholesteric liquid crystal phase is right, right circularly polarized light is reflected, and in a case where the helical twisted direction of the cholesteric liquid crystal layer is left, left circularly polarized light is reflected.

The turning direction of the cholesteric liquid crystal phase can be adjusted by the type of the liquid crystal compound forming the cholesteric liquid crystal layer and/or the type of the chiral agent to be added.

In an embodiment of the present invention, it is preferable that the cholesteric liquid crystal layer has a wavy structure described later in the cross section of the cholesteric liquid crystal layer observed with a SEM. Further, in an embodiment of the present invention, the cholesteric liquid crystal layer may have a pitch gradient structure in which the helical pitch changes in the thickness direction.

Hereinafter, the wavy structure and the pitch gradient structure will be described in detail with reference to the drawings.

Figure 5:
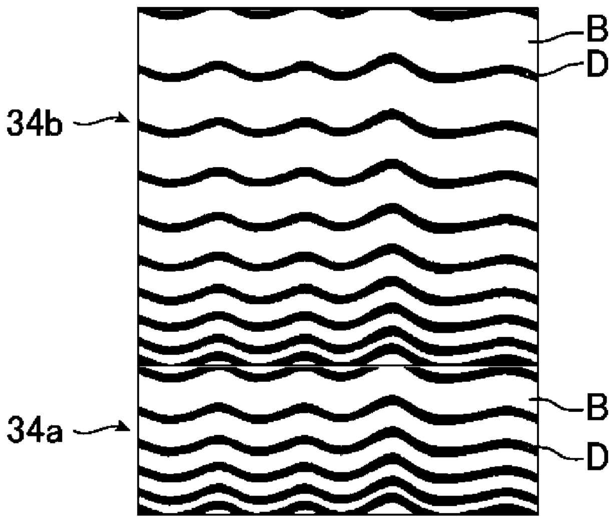
FIG. 5 is a cross-sectional view conceptually showing an example of the decorative layer.

FIG. 5 is a view conceptually showing a state in which a cross section of the decorative layer is observed with a scanning electron microscope (SEM). In the example shown in FIG. 5, the decorative layer has two cholesteric liquid crystal layers of a first cholesteric liquid crystal layer 34*a* and a second cholesteric liquid crystal layer 34*b*.

The first cholesteric liquid crystal layer 34*a* and the second cholesteric liquid crystal layer 34*b* are both cholesteric liquid crystal layers formed by immobilizing a cholesteric liquid crystal phase. Therefore, in the first cholesteric liquid crystal layer 34*a* and the second cholesteric liquid crystal layer 34*b*, a stripe pattern including a bright portion B and a dark portion D derived from the cholesteric liquid crystal phase is observed.

In the example shown in the drawing, the helical pitch of each of the first cholesteric liquid crystal layer 34*a* and the second cholesteric liquid crystal layer 34*b* gradually increases upward. That is, in the first cholesteric liquid crystal layer 34*a* and the second cholesteric liquid crystal layer 34*b*, the selective reflection center wavelength (in other words, the wavelength range of light that is selectively reflected) gradually increases upward.

In the following description, in the cholesteric liquid crystal layer, the pitch gradient structure in which the helical pitch changes in the thickness direction is also referred to as a pitch gradient structure (PG structure).

In order to form the cholesteric liquid crystal layer having a PG structure, a chiral agent that causes back isomerization, dimerization, isomerization and dimerization, or the like by light irradiation and changes its helical twisting power (HTP) is used. By irradiating a liquid crystal composition for forming the cholesteric liquid crystal layer with light having a wavelength which changes the HTP of the chiral agent before or during curing of the liquid crystal composition, the cholesteric liquid crystal layer having a PG structure can be formed.

For example, by using a chiral agent whose HTP decreases by light irradiation, the HTP of the chiral agent decreases by light irradiation.

Here, the radiated light is absorbed by the chiral agent. Accordingly, for example, in a case where light is radiated from the upper side, the irradiation dose of light gradually decreases from the upper side to the lower side. That is, the amount of decrease in the HTP of the chiral agent gradually decreases from the upper side toward the lower side. Therefore, on the upper side where the decrease in HTP is large, the induction of the helix is small, and thus the helical pitch is long. On the lower side where the decrease in HTP is small, the helix is induced by the original HTP of the chiral agent, and thus the helical pitch is short.

That is, in this case, the cholesteric liquid crystal layer selectively reflects long-wavelength light on the upper side and selectively reflects short-wavelength light on the lower side as compared with the upper side. Accordingly, by using the cholesteric liquid crystal layer having a PG structure in which the helical pitch changes in the thickness direction, light in a wide wavelength range can be selectively reflected.

By using an exposure mask having any transmittance pattern during irradiation with light having a wavelength which changes the HTP of the chiral agent, helical pitches having different reflection ranges can be formed in the plane of the cholesteric liquid crystal layer. Also, regions with and without a PG structure can be formed. That is, it is possible to form a decorative layer having various patterns of colors and designs.

In addition, in the cross section of the cholesteric liquid crystal layer observed with a SEM, a stripe pattern in which a bright portion B (bright line) and a dark portion D (dark line) are alternately laminated in the thickness direction (vertical direction in FIG. 5) is observed, and this stripe pattern is derived from the cholesteric liquid crystal phase.

Here, as shown in FIG. 5, it is preferable that at least a part of the bright portion B or the dark portion D in the cross section of the first cholesteric liquid crystal layer 34*a* and the second cholesteric liquid crystal layer 34*b* observed with a SEM has a wavy structure in which periodic wavy unevenness is formed in the plane direction.

That is, it is preferable that the first cholesteric liquid crystal layer 34*a* and the second cholesteric liquid crystal layer 34*b* have a cholesteric liquid crystal structure; and these layers have a structure in which the angle between the helical axis and the surface of the cholesteric liquid crystal layer changes periodically. In other words, it is preferable that both cholesteric liquid crystal layers have a cholesteric liquid crystal structure; each cholesteric liquid crystal layer has a stripe pattern including a bright portion B and a dark portion D in the cross-sectional view of the decorative layer observed with a SEM; and the angle formed by the normal line of the line formed by the dark portion and the surface of the cholesteric liquid crystal layer periodically changes.

It is preferable that the wavy structure is a structure in which at least one region M where the absolute value of the inclination angle of the continuous line of the bright portion B or the dark portion D forming the stripe pattern with respect to the plane of the cholesteric liquid crystal layer is 5° or more is present, and a peak or valley having an inclination angle of 0° is specified at two positions most adjacent to each other with the region M interposed therebetween in the plane direction.

The peak or valley having an inclination angle of 0° includes a protrusion shape and a recessed shape, but also includes a stepped shape or a rack shape as long as it has an inclination angle of 0°. In the wavy structure, it is preferable that the region M where the absolute value of the inclination angle of the continuous line of the bright portion B or the dark portion D in the stripe pattern is 5° or more and the peak or valley where the region M is interposed are repeated multiple times.

Figure 6:
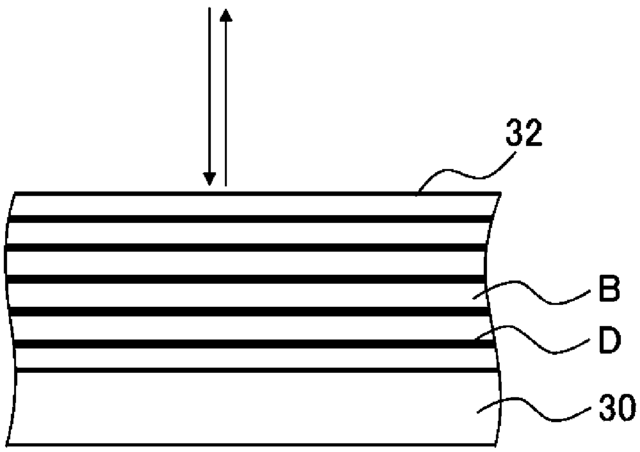
FIG. 6 is a conceptual view for describing light reflection by the cholesteric liquid crystal layer.

FIG. 6 conceptually shows a cross section of a layer formed by immobilizing a general cholesteric liquid crystal phase.

As shown in FIG. 6, when the cross section of a cholesteric liquid crystal layer 32 formed on a substrate 30 is observed by a SEM, a stripe pattern of a bright portion B and a dark portion D is observed. That is, in the cross section of the cholesteric liquid crystal layer, a layered structure in which the bright portion B and the dark portion D are alternately laminated in the thickness direction is observed.

In the cholesteric liquid crystal layer, two repetitions of the bright portion B and the dark portion D correspond to the helical pitch. From this, the helical pitch of the cholesteric liquid crystal layer can be measured from a SEM cross-sectional view.

In the cholesteric liquid crystal layer 32, the stripe pattern (layered structure) of the bright portion B and the dark portion D is typically formed to be parallel to the surface of the substrate 30 as shown in FIG. 6. In a case of such an embodiment, the cholesteric liquid crystal layer 32 exhibits mirror surface reflectivity. That is, in a case where light is incident from the normal direction of the cholesteric liquid crystal layer 32, the light is reflected in the normal direction, but the light is hardly reflected in the oblique direction. Thus, the cholesteric liquid crystal layer 32 is inferior in diffuse reflectivity (refer to the arrows in FIG. 6).

Figure 7:
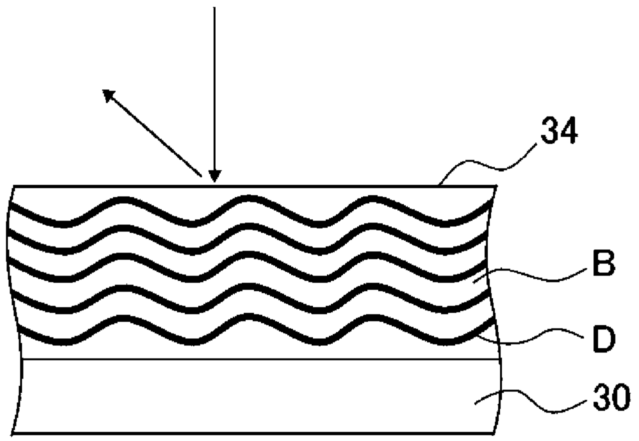
FIG. 7 is a conceptual view for describing light reflection by the cholesteric liquid crystal layer.

In contrast, in a case where the bright portion B and the dark portion D have a wavy structure (undulation structure) as in the cholesteric liquid crystal layer 34 whose cross section is conceptually shown in FIG. 7, when light is incident from the normal direction of the cholesteric liquid crystal layer 34, a part of the incident light is reflected in an oblique direction (see arrows in FIG. 7). This is because the cholesteric liquid crystal layer 34 has a region where the helical axis of the liquid crystal compound is inclined as conceptually shown in FIG. 7.

That is, in the cholesteric liquid crystal layer formed by immobilizing the cholesteric liquid crystal phase, a decorative layer having high diffuse reflectivity can be realized by providing a bright portion B and a dark portion D having a wavy structure. As a result, when the decorative layer is observed from various directions, excellent decorative properties can be obtained from any angle.

In the following description, a configuration in which the bright portion B and the dark portion D derived from the cholesteric liquid crystal phase have a wavy structure in the cross section of the cholesteric liquid crystal layer observed with a SEM will also be simply referred to as "the cholesteric liquid crystal layer has a wavy structure".

The cholesteric liquid crystal layer having a wavy structure can be formed by forming a cholesteric liquid crystal layer on the surface of a base layer described above. In particular, the cholesteric liquid crystal layer having a wavy structure can be more easily produced by forming a cholesteric liquid crystal layer on a base layer without performing an alignment treatment such as a rubbing treatment on the base layer.

That is, the base layer has no horizontal alignment regulating force with respect to the liquid crystal compound. Therefore, when the cholesteric liquid crystal layer is formed on the base layer not subjected to alignment treatment, the alignment direction of the liquid crystal compound in the surface of the base layer varies depending on the physical properties of the base layer. When the cholesteric liquid crystal layer is formed in such a state, the helical axes of the liquid crystal compounds constituting the cholesteric liquid crystal phase are oriented in various directions. As a result, the stripe pattern of the bright portion B and the dark portion D has a wavy structure in the cholesteric liquid crystal layer.

Usually, when a cholesteric liquid crystal layer is formed on another cholesteric liquid crystal layer, the upper cholesteric liquid crystal layer follows the alignment state of the surface of the lower cholesteric liquid crystal layer. In other words, when a cholesteric liquid crystal layer is formed on another cholesteric liquid crystal layer, the alignment state of the upper cholesteric liquid crystal layer conforms to the alignment state of the surface of the lower cholesteric liquid crystal layer.

Accordingly, as shown in FIG. 5, when the second cholesteric liquid crystal layer **34*b* which is a cholesteric liquid crystal layer is formed on the first cholesteric liquid crystal layer 34*a* having a wavy structure, the second cholesteric liquid crystal layer 34*b* follows the alignment state of the surface of the first cholesteric liquid crystal layer 34*a*. As a result, the second cholesteric liquid crystal layer 34*b* also has the same wavy structure as the first cholesteric liquid crystal layer 34*a*. Therefore, in the decorative layer, the first cholesteric liquid crystal layer 34*a* and the second cholesteric liquid crystal layer 34*b*** have the same wavy structure in which the period of wave, that is, unevenness of the wavy structure is substantially the same.

In a case where the decorative layer includes a plurality of cholesteric liquid crystal layers, the amplitude of the wave (the height of the wave (unevenness)) in each cholesteric liquid crystal layer may be the same as or different from each other.

Here, the HTP of the general chiral agent decreases when the chiral agent is irradiated with light. The light for changing the HTP of the chiral agent is usually radiated from the side opposite to the temporary support.

In addition, in the first cholesteric liquid crystal layer and the second cholesteric liquid crystal layer, the amplitude of the wave may be the same or different, and a region having the same amplitude of the wave and a region having a different amplitude of the wave may be mixed.

In the bright portion B and the dark portion D of the cholesteric liquid crystal layer, the entire region thereof need not have a wavy structure, and at least a part thereof is only required to have a wavy structure.

That is, the bright portion B and the dark portion D in the cholesteric liquid crystal layer may include a region not having a wavy structure due to a defect portion or the like generated here.

As described above, in order to obtain good glossiness in a laminate using the cholesteric liquid crystal layer as the decorative layer, the cholesteric liquid crystal layer preferably has a wavy structure in the bright portion B and the dark portion D derived from the cholesteric liquid crystal phase in the cross section observed with a SEM. In addition, in order to widen the selective reflection wavelength range, the cholesteric liquid crystal layer may have a PG structure in which the helical pitch changes in the thickness direction of the cholesteric liquid crystal layer.

Here, as described above, in order to form the PG structure, a chiral agent whose HTP is changed by light irradiation is used. The PG structure can be obtained by irradiating the cholesteric liquid crystal layer with light having a wavelength absorbed by the chiral agent in the formation of the cholesteric liquid crystal layer, and thereby changing the irradiation dose of light in the thickness direction, that is, changing the amount of change in HTP. Therefore, as the difference in the irradiation dose of light in the formation of the cholesteric liquid crystal layer increases in the thickness direction, the selective reflection wavelength range can be widened.

The thickness of the cholesteric liquid crystal layer is not particularly limited, but is preferably 0.05 to 15 μm, more preferably 0.2 to 10 μm, and still more preferably 0.5 to 8.0 μm.

The thickness of the decorative layer is not particularly limited, but is preferably 2.0 μm or more. The upper limit of the thickness is not particularly limited, but is 20 μm or less in many cases.

In the cholesteric liquid crystal layer, the distance between peaks (inter-peak distance) and the amplitude (wave height) of the wavy structure are also not limited.

Here, in the cholesteric liquid crystal layer having a wavy structure, as the inter-peak distance decreases, higher diffuse reflectivity is exhibited, and as the amplitude increases, higher diffuse reflectivity is exhibited.

From the viewpoint of forming a wavy structure having few defects and obtaining more excellent diffuse reflectivity, the average value of the inter-peak distance of the wavy structure of the cholesteric liquid crystal layer is preferably 0.5 to 50 μm, more preferably 1.5 to 20 μm, and still more preferably 2.5 to 10 μm.

Figure 8:
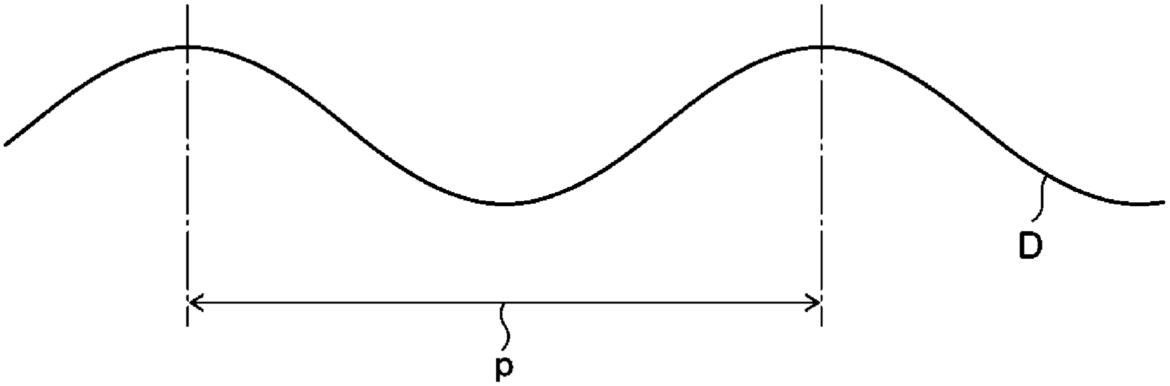
FIG. 8 is a conceptual view for describing the inter-peak distance in the wavy structure.

As conceptually shown in FIG. 8, the inter-peak distance of the wavy structure is a distance p between the vertices of the protrusions closest to each other in the wavy structure.

In addition, the average value of the inter-peak distances is specifically obtained as follows. The distance of the cholesteric liquid crystal layer in the plane direction between peaks (or valleys) having an inclination angle of 0° at two positions located most adjacent to the region M where the absolute value of the inclination angle with respect to the plane of the cholesteric liquid crystal layer is 5° or more with the region M interposed therebetween is measured. The measurement is performed at 100 positions, and the obtained values are arithmetically averaged to obtain an average value of the inter-peak distance.

In a case where the laminate according to an embodiment of the present invention has a plurality of cholesteric liquid crystal layers, the wavelength ranges at which the cholesteric liquid crystal layer selectively reflects light may be the same or different.

In addition, in a case where the laminate according to an embodiment of the present invention has a plurality of cholesteric liquid crystal layers, the turning directions of circularly polarized light reflected by respective cholesteric liquid crystal layers may be the same as or different from each other, but are preferably the same.

In addition, in the PG structure of the cholesteric liquid crystal layer, the helical pitch may gradually increase toward the upper side, or the helical pitch may gradually increase toward the lower side.

In the laminate according to an embodiment of the present invention, when the cholesteric liquid crystal layer is formed, light irradiation for curing the cholesteric liquid crystal layer may be performed after light irradiation for changing the HTP of the chiral agent is performed; or light irradiation for changing the HTP of the chiral agent and light irradiation for curing the cholesteric liquid crystal layer may be performed at the same time.

Regarding the decorative layer in the laminate according to an embodiment of the present invention, the integral reflectance I-R (λ) at the wavelength λ and the specular reflectance S-R (λ) at the wavelength λ are not limited.

Particularly, from the viewpoint of satisfying both the visibility of the display image when the display device is turned on (the decorative layer does not hinder the display image) and the visibility of the decorative layer when the display device is turned off, the maximum reflectance of the integral reflection spectrum of the decorative layer at a wavelength of 380 to 780 nm is preferably 10% to 50% and more preferably 15% to 35%. In addition, the specular reflectance of the decorative layer at a wavelength showing the maximum reflectance is preferably 15% or less and more preferably 12% or less. The lower limit of the specular reflectivity is not particularly limited, but is 1% or more in many cases.

Further, in the decorative layer of the laminate according to an embodiment of the present invention, the full width at half maximum of the reflection spectrum in the wavelength range at which light is selectively reflected is not limited.

From the viewpoint of securing reflection of light in a wider range of wavelengths, and the like, the full width at half maximum in the integral reflection spectrum is preferably 50 to 250 nm.

A method for forming the cholesteric liquid crystal layer is not particularly limited, and for example, the cholesteric liquid crystal layer can be formed using a liquid crystal composition containing a liquid crystal compound and a chiral agent.

Hereinafter, the formation method will be described in detail. First, the components contained in the composition to be used will be described in detail.

(Liquid Crystal Compound)

The liquid crystal compound used for forming the cholesteric liquid crystal layer preferably has one or more polymerizable groups. That is, a polymerizable liquid crystal compound is preferable. Further, the liquid crystal compound preferably has an average molar absorption coefficient at 320 to 400 nm of less than 5,000.

The liquid crystal compound may be a rod-like liquid crystal compound or a disk-like liquid crystal compound, but is preferably a rod-like liquid crystal compound.

Examples of the rod-like liquid crystal compound forming the cholesteric liquid crystal structure include a rod-like nematic liquid crystal compound. As the rod-like nematic liquid crystal compound, azomethines, azoxy compounds, cyanobiphenyls, cyanophenyl esters, benzoic acid esters, cyclohexane carboxylic acid phenyl esters, cyanophenylcyclohexanes, cyano-substituted phenylpyrimidines, alkoxy-substituted phenylpyrimidines, phenyldioxanes, tolans, or alkenylcyclohexylbenzonitriles are preferable.

As the liquid crystal compound, not only a low molecular liquid crystal compound but also a high molecular liquid crystal compound can be used.

The type of the polymerizable group is not particularly limited, and examples thereof include an unsaturated polymerizable group, an epoxy group, and an aziridinyl group. The polymerizable group is preferably an unsaturated polymerizable group and more preferably an ethylenically unsaturated polymerizable group. The polymerizable group can be introduced into the molecule of the liquid crystal compound by various methods.

The number of polymerizable groups contained in the liquid crystal compound is preferably 1 to 6 and more preferably 1 to 3 in one molecule.

Examples of the liquid crystal compound include compounds described in Makromol. Chem., Vol. 190, p. 2255 (1989), Advanced Materials, Vol. 5, p. 107 (1993), U.S. Pat. Nos. 4,683,327B, 5,622,648B, and 5,770,107B, WO1995/022586A, WO1995/024455A, WO1997/000600A, WO1998/023580A, WO1998/052905A, WO2016/194327A, and WO 2016/052367A, JP1989-272551A (JP-H1-272551A), JP1994-016616A (JP-H6-016616A), JP1995-110469A (JP-H7-110469A), JP1999-080081A (JP-H11-080081A), and JP2001-328973A.

The liquid crystal composition may contain two or more types of liquid crystal compounds.

In addition, the content of the liquid crystal compound in the liquid crystal composition is not particularly limited, but is preferably 70 to 99.9 mass %, more preferably 75 to 99.5 mass %, and still more preferably 80 to 99 mass % with respect to the mass of the solid content (mass excluding the solvent) of the liquid crystal composition.

(Chiral Agent: Optically Active Compound)

As the chiral agent used for forming the cholesteric liquid crystal layer, various known chiral agents can be used as long as the HTP thereof is changed by irradiation with light. Among those, a chiral agent having a molar absorption coefficient at a wavelength of 313 nm or 365 nm of 30,000 or more is preferable.

The chiral agent has a function of inducing the helical structure of the cholesteric liquid crystal phase. The helical sense or the helical pitch to be induced varies depending on the chiral compound, and thus the chiral agent may be selected according to the purpose.

As the chiral agent, a well-known compound can be used, but a compound having a cinnamoyl group is preferable. Examples of the chiral agent include compounds described in Liquid Crystal Devices Handbook (Chapter 3, Item 4-3, Chiral Agents for TN and STN, p. 199, edited by No. 142 Committee of Japan Society for the Promotion of Science, 1989), and JP2003-287623A, JP2002-302487A, JP2002-080478A, JP2002-080851A, JP2010-181852A, and JP 2014-034581A.

The chiral agent generally contains an asymmetric carbon atom, but an axially asymmetric compound or a planarly asymmetric compound containing no asymmetric carbon atom can also be used as the chiral agent. As an example of an axially asymmetric compound or a planarly asymmetric compound, binaphthyl, helicene, paracyclophane, and derivatives thereof are included. The chiral agent may contain a polymerizable group.

In a case where both the chiral agent and the liquid crystal compound have a polymerizable group, a polymer having a repeating unit derived from the polymerizable liquid crystal compound and a repeating unit derived from the chiral agent can be formed by a polymerization reaction between the polymerizable chiral agent and the polymerizable liquid crystal compound. In this embodiment, the polymerizable group contained in the polymerizable chiral agent is preferably the same group as the polymerizable group contained in the polymerizable liquid crystal compound. Accordingly, the polymerizable group of the chiral agent is also preferably an unsaturated polymerizable group, an epoxy group, or an aziridinyl group, more preferably an unsaturated polymerizable group, and still more preferably an ethylenically unsaturated polymerizable group.

Further, the chiral agent may also be a liquid crystal compound.

The chiral agent is preferably an isosorbide derivative, an isomannide derivative, or a binaphthyl derivative. As the isosorbide derivative, a commercially available product such as LC-756 (manufactured by BASF SE) may be used.

The content of the chiral agent in the liquid crystal composition is preferably 0.01 to 200 mol % and more preferably 1 to 30 mol % with respect to the total molar amount of the liquid crystal compound.

(Polymerization Initiator)

The liquid crystal composition preferably contains a polymerization initiator. In an embodiment in which a polymerization reaction is caused to proceed by ultraviolet irradiation, the polymerization initiator to be used is preferably a photopolymerization initiator capable of initiating the polymerization reaction by ultraviolet irradiation.

As a usable polymerization initiator, an acylphosphine oxide compound and an oxime compound are preferable.

The polymerization initiator may be used alone or in combination of two or more types thereof.

In a case where light irradiation for curing the cholesteric liquid crystal layer is performed after light irradiation for changing the HTP of the chiral agent is performed in the formation of the cholesteric liquid crystal layer, it is preferable to use a photopolymerization initiator with which polymerization hardly proceeds by the light irradiation for changing the HTP of the chiral agent. In this case, the content of the photopolymerization initiator in the liquid crystal composition is preferably 0.05 to 3 mass % and more preferably 0.3 to 2 mass % with respect to the total mass of the liquid crystal compound.

In addition, in a case where light irradiation for changing the HTP of the chiral agent and light irradiation for curing the cholesteric liquid crystal layer are performed at the same time, the content of the photopolymerization initiator in the liquid crystal composition is preferably 0.01 to 0.3 mass % and more preferably 0.01 to 0.2 mass % with respect to the total mass of the liquid crystal compound.

(Crosslinking Agent)

The liquid crystal composition optionally contains a crosslinking agent in order to improve film strength after curing and durability. As the crosslinking agent, a compound that is cured with ultraviolet rays, heat, moisture, or the like can be suitably used.

The crosslinking agent is not particularly limited, and examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylenediisocyanate and a biuret type isocyanate; polyoxazoline compounds having an oxazoline group in a side chain thereof; and alkoxysilane compounds such as vinyltrimethoxysilane and N-(2-aminoethyl)-3-aminopropyltrimethoxysilane.

The content of the crosslinking agent in the liquid crystal composition is preferably 0.2 to 5 mass % and more preferably 0.5 to 3 mass % with respect to the solid content of the liquid crystal composition.

(Alignment Control Agent)

The liquid crystal composition may contain an alignment control agent that contributes to stably or rapidly forming a cholesteric liquid crystal structure having a planar alignment.

Examples of the alignment control agent include fluorine (meth)acrylate-based polymers described in paragraphs [0018] to [0043] of JP2007-272185A, and compounds represented by Formulae (I) to (IV) described in paragraphs [0031] to [0034] of JP2012-203237A.

The alignment control agent may be used alone or in combination of two or more types thereof.

The content of the alignment control agent in the liquid crystal composition is preferably 0.01 to 10 mass % and more preferably 0.01 to 5 mass % with respect to the total mass of the liquid crystal compound.

(Surfactant)

The liquid crystal composition may contain a surfactant.

The surfactant is preferably a compound capable of functioning as an alignment control agent that contributes to stably or rapidly forming a cholesteric structure having a planar alignment. Examples of the surfactant include a silicone-based surfactant and a fluorine-based surfactant, and a fluorine-based surfactant is preferable.

The content of the surfactant in the liquid crystal composition is preferably 0.01 to 10 mass % and more preferably 0.01 to 5 mass % with respect to the total mass of the liquid crystal compound.

(Solvent)

The liquid crystal composition may contain a solvent.

An organic solvent is preferably used as the solvent. The type of the organic solvents is not particularly limited, and examples thereof include ketones, alkyl halides, amides, sulfoxides, heterocyclic compounds, hydrocarbons, esters, and ethers.

The solvent may be used alone or in combination of two or more types thereof.

(Other Additives)

The liquid crystal composition may further contain, as necessary, a polymerization inhibitor, an antioxidant, an ultraviolet absorber, a photostabilizer, a coloring material, metal oxide fine particles, and the like as long as the optical performance is not deteriorated.

The cholesteric liquid crystal layer can be formed by dissolving a liquid crystal compound, a chiral agent, a polymerization initiator, and a surfactant to be added as necessary, and the like in a solvent to prepare a liquid crystal composition; applying the liquid crystal composition to a base layer and drying the composition to obtain a coating film; aligning the liquid crystal compound in the coating film; and irradiating the coating film with actinic rays to cure the liquid crystal composition. As a result, a cholesteric liquid crystal layer having a cholesteric liquid crystal structure in which cholesteric regularity is immobilized can be formed.

Examples of the method of applying the liquid crystal composition include a wire bar coating method, a curtain coating method, an extrusion coating method, a direct gravure coating method, a reverse gravure coating method, a die coating method, a spin coating method, a dip coating method, a spray coating method, and a slide coating method.

The method of aligning the liquid crystal compound in the coating film formed by applying the liquid crystal composition may be, for example, a heating treatment. The temperature of the heat treatment is preferably 200° C. or less and more preferably 130° C. or less. By this alignment treatment, a structure in which the liquid crystal compound is twist-aligned to have a helical axis is obtained.

Then, the liquid crystal composition is cured by polymerizing the aligned liquid crystal compound, thereby forming a cholesteric liquid crystal layer.

The light irradiation for curing the liquid crystal composition is preferably performed by ultraviolet irradiation. The illuminance of the ultraviolet rays is preferably 15 to 1,500 $mW/cm^2$ and more preferably 50 to 600 $mW/cm^2$. In addition, the irradiation energy of the ultraviolet rays is preferably 20 $mJ/cm^2$ to 50 $J/cm^2$ and more preferably 100 to 1,500 $mJ/cm^2$.

When the cholesteric liquid crystal layer having a PG structure is formed, the liquid crystal composition is irradiated with light for changing the HTP of the chiral agent before curing the liquid crystal composition. Alternatively, in the formation of the cholesteric liquid crystal layer having a PG structure, light irradiation for changing the HTP of the chiral agent and light irradiation for curing the liquid crystal composition may be performed at the same time.

In the formation of the cholesteric liquid crystal layer, ultraviolet irradiation may be performed while heating in order to promote the change in the HTP of the chiral agent. The oxygen concentration at the time of ultraviolet irradiation for promoting the change in the HTP of the chiral agent is not limited. Therefore, the ultraviolet irradiation may be performed in an oxygen atmosphere or in a low-oxygen atmosphere.

The temperature at the time of ultraviolet irradiation is preferably 25 to 140° C. and more preferably 30 to 100° C.

In addition, the oxygen concentration at the time of ultraviolet irradiation is preferably 5,000 ppm by volume or less and more preferably 100 ppm by volume or less.

[Ultraviolet Absorbing Layer]

The ultraviolet absorbing layer is a layer having a low transmittance of ultraviolet rays.

The ultraviolet absorbing layer preferably has a transmittance at a 380 nm of wavelength of less than 10%, more preferably 8% or less, and still more preferably 4% or less. The lower limit of the transmittance is not particularly limited, but is 2% or more in many cases.

As the ultraviolet absorbing layer, a layer in which an ultraviolet absorber is dispersed in a layer or film (hereinafter, may be collectively referred to as a "film") containing a polymer, and a layer in which an ultraviolet absorber is dispersed in a binder can be used.

The ultraviolet absorber is a compound having ultraviolet absorbing performance and a molecular weight of less than 5,000. In a case where the ultraviolet absorber has a molecular weight distribution, the above-described molecular weight refers to a weight average molecular weight measured by the above-described method. In a case where the ultraviolet absorber does not have a molecular weight distribution, the molecular weight is measured using, for example, electrospray ionization mass spectrometry (ESI-MS).

The ultraviolet absorber is preferably a compound having a maximum absorption wavelength of 380 nm or less and more preferably a compound having a maximum absorption wavelength of 250 to 380 nm (preferably 270 to 380 nm).

Examples of the ultraviolet absorber include a triazine compound, a benzotriazole compound, a benzophenone compound, a salicylic acid compound, and metal oxide particles. From the viewpoint of ultraviolet absorbing performance, the ultraviolet absorber preferably contains a triazine compound or a benzotriazole compound, and more preferably contains a triazine compound. The total content of the triazine compound and the benzotriazole compound in the ultraviolet absorber is preferably 80 mass % or more with respect to the total amount of the ultraviolet absorber.

As the layer or film containing a polymer, for example, a layer or film containing a cellulose acylate-based polymer, a polycarbonate-based polymer, a polyester-based polymer such as polyethylene terephthalate or polyethylene naphthalate, an acrylic polymer such as polymethyl methacrylate, a styrene-based polymer such as polystyrene or an acrylonitrile-styrene copolymer (AS resin), or the like can be used. Further, the polymer layer or film may also be produced by selecting one or more from the following polymers and using the selected polymer as a main component. Examples of the polymer used as a main component include polyolefins such as polyethylene and polypropylene, polyolefin-based polymers such as an ethylene-propylene copolymer, cycloolefin-based polymers, vinyl chloride-based polymers, amide-based polymers such as nylon and aromatic polyamides, imide-based polymers, sulfone-based polymers, polyethersulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, and a polymer obtained by mixing these polymers.

As the binder, at least one selected from the group consisting of (meth)acrylic resins, polyester resins, urethane resins, olefin resins, siloxane resins, and, fluororesins is preferable; at least one selected from the group consisting of (meth)acrylic resins, polyester resins, urethane resins, and olefin resins is more preferable; and (meth)acrylic resins are still more preferable.

The ultraviolet absorbing layer may serve as both the oxygen blocking layer and the low-moisture permeable layer. In addition, the oxygen blocking layer may also serve as the low-moisture permeable layer.

[Oxygen Blocking Layer]

As described above, the oxygen blocking layer is a layer having an oxygen permeability of 120 cc/($m^2$×day×atm) or less.

Specific examples of the oxygen blocking layer include layers containing an organic compound such as a polyvinyl alcohol-based resin, a polyethylene vinyl alcohol-based resin, a polyvinyl ether-based resin, polyvinylpyrrolidone, polyacrylamide, polyacrylic acid, cellulose ether, a polyamide-based resin, a polyimide-based resin, a styrene/maleic acid copolymer, gelatin, vinylidene chloride, and a cellulose nanofiber.

Among them, from the viewpoint of high oxygen blocking capability, the oxygen blocking layer is preferably a layer containing a polyvinyl alcohol-based resin or a polyethylene vinyl alcohol-based resin, and particularly preferably a layer containing a polyvinyl alcohol-based resin.

The material contained in the oxygen blocking layer may be a cured product of a polymerizable compound.

Examples of the polymerizable compound having a high oxygen blocking function include a polymerizable compound having a high hydrogen bonding property and a compound having many polymerizable groups per molecular weight. Examples of the compound having many polymerizable groups per molecular weight include pentaerythritol tetra(meth)acrylate and dipentaerythritol hexa(meth)acrylate.

Specific examples of the polymerizable compound having a high hydrogen bonding property include compounds represented by the following formula. Among them, 3',4'-epoxycyclohexylmethyl-3,4-epoxycyclohexanecarboxylate represented by the following CEL2021P is preferable.

The oxygen blocking layer may also be a thin layer containing a metal compound (metal compound thin layer), for example. As a method for forming the metal compound thin layer, any method can be used as long as a desired thin layer can be formed by the method. For example, a sputtering method, a vacuum deposition method, an ion plating method, and a plasma chemical vapor deposition (CVD) method are suitable. Specifically, the formation methods described in JP3400324B, JP 2002-322561A, and JP2002-361774A can be employed.

The component contained in the metal compound thin layer is not particularly limited as long as it can exhibit an oxygen blocking function. For example, an oxide, a nitride, or an oxynitride containing one or more metals selected from Si, Al, In, Sn, Zn, Ti, Cu, Ce, Ta, or the like can be used. Among these, an oxide, a nitride, or an oxynitride of a metal selected from Si, Al, In, Sn, Zn, and Ti is preferable, and an oxide, a nitride, or an oxynitride of a metal selected from Si, Al, Sn, and Ti is particularly preferable. The oxide, nitride, or oxynitride may contain other elements as secondary components. Layers containing a reaction product of an aluminum compound and a phosphorus compound, as described in JP2016-40120A and JP2016-155255A, are also preferable.

The oxygen blocking layer may be in the form of a laminate of a layer containing the above-described organic materials and a metal compound thin layer, as described in, for example, U.S. Pat. No. 6,413,645B, JP2015-226995A, JP2013-202971A, JP2003-335880A, JP1978-012953A (JP-S53-012953A), and JP1983-217344A (JP-S58-217344A). The oxygen blocking layer may also be a hybrid layer of organic compounds and inorganic compounds, as described in WO2011/011836A, JP2013-248832A, and JP3855004B.

In a case where the oxygen blocking layer is a layer containing an organic compound, the film thickness of the oxygen blocking layer is preferably 0.1 to 10 μm and more preferably 0.5 to 5.5 μm. In a case where the oxygen blocking layer is a metal compound thin layer, the film thickness of the oxygen blocking layer is preferably 5 to 500 nm and more preferably 10 to 200 nm.

In an embodiment of the present invention, the in-plane average refractive index of the oxygen blocking layer at a wavelength of 550 nm is preferably 1.50 to 1.65 and more preferably 1.55 to 1.65 from the viewpoint of suppressing internal reflection.

In an embodiment of the present invention, the oxygen blocking layer may also be a layer having a function of a surface protective layer or an adhesive layer. In a case where the oxygen blocking layer is a layer also serving as an adhesive layer, an embodiment in which the oxygen blocking layer is an adhesive containing a polyvinyl alcohol resin is preferable.

In addition, in a case where the oxygen blocking layer is a layer containing a polyvinyl alcohol-based resin or a polyethylene vinyl alcohol-based resin, the degree of saponification of the polyvinyl alcohol-based resin and/or the polyethylene vinyl alcohol-based resin is preferably 83% or more, more preferably 90% or more, and still more preferably 96% or more. In the polyvinyl alcohol-based resin and/or the polyethylene vinyl alcohol-based resin, as the degree of saponification increases, gas barrier properties are improved (oxygen permeability decreases).

[Low-Moisture Permeable Layer]

As described above, the low-moisture permeable layer is a layer having a moisture permeability of 40 g/($m^2$×day) or less.

The material constituting the low-moisture permeable layer used in an embodiment of the present invention is not particularly limited. The material constituting the low-moisture permeable layer may be a layer or film containing a polymer (hereinafter sometimes collectively referred to as "film"). For example, a cellulose acylate-based polymer, a polycarbonate-based polymer, a polyester-based polymer such as polyethylene terephthalate or polyethylene naphthalate, an acrylic polymer such as polymethyl methacrylate, a styrene-based polymer such as polystyrene or an acrylonitrile-styrene copolymer (AS resin), or the like can be used as the material. Further, the polymer layer or film may also be produced by selecting one or more from the following polymers and using the selected polymer as a main component. Examples of the polymer used as a main component include polyolefins such as polyethylene and polypropylene, polyolefin-based polymers such as an ethylene-propylene copolymer, cycloolefin-based polymers, vinyl chloride-based polymers, amide-based polymers such as nylon and aromatic polyamides, imide-based polymers, sulfone-based polymers, polyethersulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, and a polymer obtained by mixing these polymers.

As the low-moisture permeable layer used in an embodiment of the present invention, a cellulose acylate-based polymer layer, a polyester-based polymer layer, an acrylic polymer layer, or a cycloolefin-based polymer layer is preferable. That is, the low-moisture permeable layer may be a laminate of two or more types of polymer layers and a layer containing a composition. In an embodiment in which the low-moisture permeable layer includes a cellulose acylate-based polymer layer, for the purpose of lowering the moisture permeability of the low-moisture permeable layer, the low-moisture permeable layer preferably further includes a polyester-based polymer layer, an acrylic polymer layer, a cycloolefin-based polymer layer, and a layer containing a liquid crystal compound.

<Cellulose Acylate-Based Polymer Layer>

In the present specification, the "cellulose acylate-based polymer layer" refers to a layer or film containing cellulose acylate as a main component (50 mass % or more of all components). The cellulose acylate used for producing the film is one in which the hydrogen atom of the hydroxyl group of cellulose is substituted with an acyl group. Cellulose acylate is a material in which the hydroxyl group of cellulose is acylated, and as a substituent thereof, any of acyl groups having 2 (acetyl group) to 22 carbon atoms can be used.

The cellulose acylate used in an embodiment of the present invention is not particularly limited. Among these, the degree of acetyl substitution of cellulose acylate is preferably 2.00 to 2.95, more preferably 2.70 to 2.95, still more preferably 2.75 to 2.90, and particularly preferably 2.82 to 2.89. When the degree of acetyl substitution is 2.70 or more, the compatibility with the aromatic ester oligomer satisfying the conditions described later is good, and the film is less likely to be whitened, which is preferable. Further, in addition to the transparency, the moisture permeability and the moisture content are improved, which is preferable. Meanwhile, the degree of acetyl substitution is preferably 2.95 or less from the viewpoint of optical performance. A preferred range of the degree of total acyl substitution is also the same as the preferred range of the degree of acetyl substitution. The degree of substitution with an acyl group can be measured in accordance with the method specified in ASTM-D817-96. A moiety not substituted with an acyl group is usually present as a hydroxyl group.

Among the acyl groups having 2 to 22 carbon atoms with which the hydroxyl group of cellulose is substituted, the acyl group having 2 to 22 carbon atoms may be an aliphatic group or an allyl group and is not particularly limited, and may be a single acyl group or a mixture of two or more types thereof. These are for example, alkylcarbonyl esters, alkenylcarbonyl esters, aromatic carbonyl esters, and aromatic alkylcarbonyl esters of cellulose, each of which may further have a substituent. Examples of these preferred acyl groups include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl t-butanoyl group, a cyclohexanecarbonyl group, an oleoyl group, a benzoyl group, a naphthylcarbonyl group, and a cinnamoyl group. Among these, an acetyl group, a propionyl group, a butanoyl group, a dodecanoyl group, an octadecanoyl group, a t-butanoyl group, an oleoyl group, a benzoyl group, a naphthylcarbonyl group, or a cinnamoyl group is preferable; and an acetyl group, a propionyl group, or a butanoyl group is more preferable.

In the cellulose acylate used in an embodiment of the present invention, a substituent is preferably an acetyl group or a propionyl group, and preferably an acetyl group.

In addition, a mixed fatty acid cellulose acylate may also be used. Specific examples of the mixed fatty acid cellulose acylate include cellulose acetate propionate and cellulose acetate butyrate, and cellulose acetate propionate is preferable.

The basic principle of a method for synthesizing cellulose acylate is described in Migita et al., Chemistry of Wood, p. 180 to 190 (Kyoritsu Shuppan Co., Ltd., 1968). A typical synthesis method is a liquid phase acetylation method using a carboxylic anhydride, acetic acid, and a sulfuric acid catalyst.

The number average molecular weight (Mn) of the cellulose acylate contained in the cellulose acylate-based polymer layer is preferably 40,000 to 200,000 and more preferably 100,000 to 200,000. The Mw/Mn ratio of the cellulose acylate contained in the cellulose acylate-based polymer layer is preferably 4.0 or less and more preferably 1.4 to 2.3.

In an embodiment of the present invention, the average molecular weight and the molecular weight distribution of the cellulose acylate or the like can be obtained by calculating the number average molecular weight (Mn) and the weight average molecular weight (Mw) using gel permeation chromatography (GPC), and calculating the ratio thereof by the method described in WO2008/126535A.

The cellulose acylate-based polymer layer may contain an additive together with the cellulose acylate as a main component, and preferably contains, for example, at least one type of aromatic ester oligomer. It is preferable to add the aromatic ester oligomer in a small amount because the Knoop hardness of the cellulose acylate-based polymer layer can be increased. For example, the Knoop hardness of the cellulose acylate film can be increased by subjecting the cellulose acylate film containing an aromatic ester oligomer to stretching treatment (preferably, biaxial stretching treatment). The Knoop hardness is one of the scales representing the hardness of a material, and is one type of indentation hardness.

Further, by adding the additive, it is also possible to improve the durability required in association with an increase in moisture permeability due to thinning of the cellulose acylate-based polymer layer.

[λ/4 Retardation Layer]

The λ/4 retardation layer is a plate having a λ/4 function, and specifically, a plate having a function of converting linearly polarized light having a specific wavelength into circularly polarized light or converting circularly polarized light into linearly polarized light.

The λ/4 retardation layer is disposed so as to convert linearly polarized light emitted from the display element, or linearly polarized light emitted from the display element and converted by passing through the polarizer, into circularly polarized light in a turning direction which is not reflected by the cholesteric liquid crystal layer as a decorative layer. As a result, for example, in a case where the laminate is disposed on the surface of the display element (display), the color of the laminate (decorative layer) can be seen in a case where the display is turned off or black display, and an image displayed by the display can be visually recognized through the laminate in a case of color display.

Specific examples of the λ/4 retardation layer include those described in US2015/0277006A.

Specifically, as an embodiment of a λ/4 retardation layer having a single-layer structure, a retardation film in which an optically anisotropic layer having a λ/4 function is provided on a stretched polymer film or a support is exemplified. As an embodiment of a λ/4 retardation layer having a multilayer structure, a broadband λ/4 retardation layer formed by laminating a λ/4 retardation layer and a λ/2 retardation plate is exemplified.

The λ/4 retardation layer can be formed by, for example, applying a liquid crystal composition containing a liquid crystal compound.

More preferably, the λ/4 retardation layer is a retardation film having one or more layers containing at least one liquid crystal compound (a disk-like liquid crystal compound, a rod-like liquid crystal compound, or the like) formed by polymerizing a liquid crystal monomer exhibiting a nematic liquid crystal layer or a smectic liquid crystal layer.

In addition, from the view point of obtaining a λ/4 retardation layer having excellent optical performance, it is still more preferable to use a liquid crystal compound having reverse wavelength dispersibility. Specifically, a liquid crystal compound represented by General Formula (II) described in WO2017/043438A is preferably used. Regarding the production method of the λ/4 retardation layer using a liquid crystal compound having reverse wavelength dispersibility, the description of Examples 1 to 10 of WO2017/043438A and Example 1 of JP2016-91022A can be referred to.

The thickness of the λ/4 retardation layer is not particularly limited, but is preferably 0.1 to 100 μm and more preferably 0.5 to 5 μm.

[Polarizer]

The polarizer is disposed on the λ/4 retardation layer on a side opposite to the decorative layer.

The polarizer is a linear polarizer having a function of converting light into specific linearly polarized light. The linear polarizer is not particularly limited, and examples thereof include an absorption type polarizer and a reflection type polarizer known in the related art.

An iodine-based polarizer, a dye-based polarizer using a dichroic dye, a polyene-based polarizer, and the like are used as the absorption type polarizer. Examples of the iodine-based polarizer and the dye-based polarizer include a coating type polarizer and a stretching type polarizer, any of which can be applied, but a polarizer produced by causing iodine or a dichroic dye to adsorb to polyvinyl alcohol and performing stretching is preferable.

In addition, examples of a method for obtaining a polarizer by performing stretching and dyeing in a state of a laminate film in which a polyvinyl alcohol layer is formed on a substrate include the methods described in JP5048120B, JP5143918B, JP5048120B, JP4691205B, JP4751481B, and JP4751486B.

Among these, from the viewpoint that adhesiveness to other layers is more excellent, a polarizer containing a polyvinyl alcohol-based resin (polymer including —CH2-CHOH— as a repeating unit, in particular, at least one selected from the group consisting of polyvinyl alcohol and an ethylene-vinyl alcohol copolymer) is preferable.

The thickness of the linear polarizer is not particularly limited, but is preferably 3 to 60 μm, more preferably 5 to 30 μm, and still more preferably 5 to 15 μm.

[Other Layers]

The laminate according to an embodiment of the present invention may further have layers (members) other than the above-described layers. Examples of the other layers (other members) include a pressure-sensitive adhesive layer, a surface protective layer, an antireflection layer, a non-glossy layer, and a tactile sensation imparting layer.

<Pressure-Sensitive Adhesive Layer>

The pressure-sensitive adhesive layer can be used for improving the adhesiveness of each layer. As the pressure-sensitive adhesive and the adhesive normally used in the pressure-sensitive adhesive layer, a pressure-sensitive adhesive (for example, an acrylic pressure-sensitive adhesive), an adhesive (for example, an ultraviolet curable adhesive and a polyvinyl alcohol-based adhesive), and the like which are typically used can be used. Specific examples of the pressure-sensitive adhesive and the adhesive that can be used include the pressure-sensitive adhesives described in paragraphs [0100] to [0115] of JP2011-037140A and paragraphs [0155] to [0171] of JP2009-292870A, or the like.

The thickness of the pressure-sensitive adhesive layer is not particularly limited, but is preferably 1 to 30 μm, more preferably 2 to 20 μm, and still more preferably 4 to 15 μm.

<Surface Protective Layer>

The surface protective layer is not limited as long as it has a function of protecting the surface, and may be a single layer or a plurality of layers. The surface protective layer preferably has not only high hardness, but also high recoverability. As the surface protective layer, a surface protective layer known in the related art can be used.

<Antireflection Layer>

The antireflection layer is a layer that is disposed on the outermost surface of the laminate and prevents reflection of external light. In a case where the laminate is used in a display device as shown in FIG. 1, the antireflection layer is disposed on the outermost surface on the viewing side.

As the antireflection layer, an antireflection layer known in the related art, such as a circularly polarizing plate, can be used.

<Non-Glossy Layer>

The non-glossy layer (antiglare layer) is a layer that is disposed on the outermost surface of the laminate and suppresses the gloss of the surface. As the antiglare layer, an antiglare layer known in the related art can be used. For example, the antiglare layer described in paragraph [0276] of JP2007-86748A can be used as the antiglare layer.

<Tactile Sensation Imparting Layer>

The tactile sensation imparting layer is a layer that is disposed on the outermost surface of the laminate and imparts a tactile sensation to the surface of the laminate.

Examples of the tactile sensation imparting layer include a layer in which an uneven shape is imparted to the surface, and a layer in which particles are contained in the tactile sensation imparting layer and the particles are exposed. As the tactile sensation imparting layer, a tactile sensation imparting layer known in the related art can be used. For example, the tactile sensation imparting layer described in paragraphs [0043] to [0049] of JP2020-049702A can be used as the tactile sensation imparting layer.

[Display Element]

As described above, the display device (image display device) according to an embodiment of the present invention has a display element and the above-described laminate disposed on the display element.

The display element used in the display device according to an embodiment of the present invention is not particularly limited, and examples thereof include a liquid crystal cell, an organic electroluminescence (organic EL) display panel, an inorganic electroluminescence (inorganic EL) display panel, and a plasma display panel.

Among these, a liquid crystal cell, an organic EL display panel, or an inorganic EL display panel is preferable, and an organic EL display panel or an inorganic EL display panel is more preferable. That is, the display device according to an embodiment of the present invention is preferably a liquid crystal display device using a liquid crystal cell as a display element or an EL display device using an EL display panel as a display element.

It is preferable that light emitted from the display element is linearly polarized light.

In a case where the display element has a linear polarizer such as a liquid crystal cell, the linear polarizer of the display element may also serve as the polarizer 20 in the laminate.

In a case where the display device has the laminate, the pattern of the laminate itself is visually recognized in a case where an image is not displayed by the display element. Here, since the display device according to an embodiment of the present invention has the above-described laminate, the pattern of the laminate (decorative layer) can be satisfactorily visually recognized in a case where an image is not displayed by the display element.

<Liquid Crystal Display Device>

The liquid crystal display device which is an example of the display device according to an embodiment of the present invention is disposed such that the polarizer side of the laminate is the liquid crystal cell side.

The liquid crystal cell used in the liquid crystal display device is preferably in a vertical alignment (VA) mode, an optically compensated bend (OCB) mode, an in-plane-switching (IPS) mode, or a twisted nematic (TN) mode, but is not limited thereto.

In the TN mode liquid crystal cell, rod-like liquid crystalline molecules (rod-like liquid crystal compounds) are substantially horizontally aligned, and further twist-aligned at 60 to 120° when no voltage is applied. The TN mode liquid crystal cell is most often used as a color TFT liquid crystal display device and is described in numerous documents.

In the VA mode liquid crystal cell, rod-like liquid crystalline molecules are substantially vertically aligned when no voltage is applied. The VA mode liquid crystal cell includes (1) a narrowly defined VA mode liquid crystal cell in which rod-like liquid crystalline molecules are aligned substantially vertically when no voltage is applied and aligned substantially horizontally when a voltage is applied (JP1990-176625A (JP-H2-176625A)), (2) a multi-domain vertical alignment (MVA) mode liquid crystal cell in which a VA mode is multi-domained to enlarge the viewing angle (SID97, Digest of tech. Papers (Proceedings) 28 (1997) 845), (3) a liquid crystal cell in an axially symmetric aligned microcell (n-ASM) mode in which rod-like liquid crystalline molecules are substantially vertically aligned when no voltage is applied and are aligned in twisted multi-domain alignment when a voltage is applied (Proceedings of Japanese Liquid Crystal Conference, 58 and 59 (1998)), and (4) a SURVIVAL mode liquid crystal cell (presented in liquid crystal display (LCD) international 98). In addition, any of a patterned vertical alignment (PVA) type, an optical alignment type, and a polymer-sustained alignment (PSA) type may be used. The details of these modes are described in JP2006-215326A and JP2008-538819A.

In the IPS mode liquid crystal cell, rod-like liquid crystalline molecules are aligned substantially parallel to the substrate, and the liquid crystal molecules respond in a planar manner when an electric field parallel to the substrate surface is applied. In the IPS mode, black display is performed when no electric field is applied, and absorption axes of a pair of upper and lower polarizing plates are orthogonal to each other. For example, JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A) disclose a method of improving the viewing angle by using an optical compensation sheet to reduce leakage light during black display in an oblique direction.

[EL Display Device]

An electroluminescent (EL) display device which is an example of the display device according to an embodiment of the present invention is disposed such that the polarizer side of the laminate is the EL display panel side.

In the EL display device, various known EL substrates used for a self-light emitting type display device using an inorganic EL light emitting element, an organic EL light emitting element, or the like can be used. An example of the organic EL display panel is a display panel configured using an organic EL element in which an organic light emitting layer (organic electroluminescent layer) is sandwiched between electrodes (between a cathode and an anode). The configuration of the organic EL display panel is not particularly limited, and a known configuration is employed. The inorganic EL is a so-called light emitting diode (LED).

The laminate and the display device according to an embodiment of the present invention are suitably used for automobiles, portable electronic devices, and the like.

For example, the laminate and the display device according to an embodiment of the present invention can be used for a display device mounted on an automobile such as, a display device of a car navigation system of an automobile, and a monitor showing the surroundings of an automobile, such as the rear or the side of the automobile instead of a room mirror, a side mirror, or the like.

In addition, the laminate and the display device according to an embodiment of the present invention can be used as a display device of a portable electronic device such as a smartphone, a smart watch, and a tablet PC.

EXAMPLES

Hereinafter, the present invention will be described in greater detail based on Examples. In the following Examples, materials, amounts to be used, ratios thereof, the details of the treatment, the treatment procedures, and the like may be suitably modified without departing from the scope of the present invention. Accordingly, the scope of the present invention should not be interpreted in a limited way by Examples to be described below.

Example 1

<Production of Ultraviolet Absorbing Layer 1>

(Preparation of Core Layer Cellulose Acylate Dope 1)

The following composition was charged in a mixing tank and stirred to dissolve each component, thereby preparing a core layer cellulose acylate dope 1.

Cellulose acetate having a degree of acetyl substitution of 2.88: 100 parts by mass Ester oligomer (compound 1-1): 10 parts by mass Durability improver (compound 1-2): 4.2 parts by mass Ultraviolet absorber (compound 1-3): 3.3 parts by mass Methylene chloride (first solvent): 438 parts by mass Methanol (second solvent): 65 parts by mass (Compound 1-1)

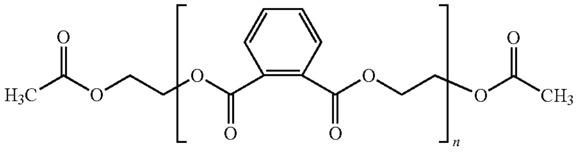

Molecular weight 1,000

-continued (Compound 1-2)

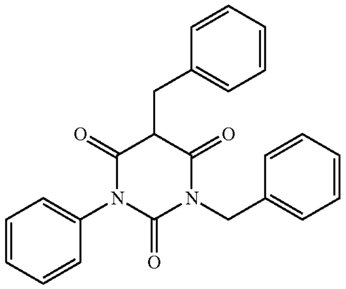

(Compound 1-3)

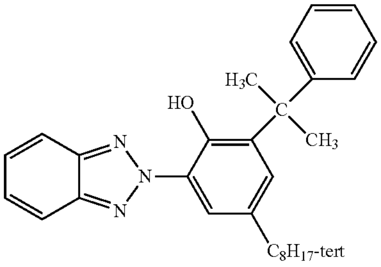

(Preparation of Outer Layer Cellulose Acylate Dope 1)

To 90 parts by mass of the above-described core layer cellulose acylate dope 1, 10 parts by mass of a matting agent dispersion liquid 1 having the following composition was added to prepare an outer layer cellulose acylate dope 1.

- Silica particles having an average particle size of 20 nm (AEROSIL R972, manufactured by Nippon Aerosil Co., Ltd.): 2 parts by mass
- Methylene chloride (first solvent): 76 parts by mass
- Methanol (second solvent): 11 parts by mass
- Core layer cellulose acylate dope 1:1 part by mass (Film Formation of Ultraviolet Absorbing Layer 1)

Three layers including one layer of the core layer cellulose acylate dope 1 and two layers of the outer layer cellulose acylate dope 1 were simultaneously cast from a casting port onto a drum at 20° C. such that the layers of the outer layer cellulose acylate dope 1 are provided on both sides of the layer of the core layer cellulose acylate dope 1. The film on the drum was peeled off in a state in which the solvent content in the film was approximately 20 mass %, and both ends in the width direction of the film were immobilized with tenter clips. Then, the film was dried while being stretched 1.1 times in the transverse direction in a state in which the residual solvent was 20 mass %. Thereafter, the obtained film was conveyed between rolls in a heat treatment device to produce a cellulose acylate film having a thickness of 40 μm, and this was used as an ultraviolet absorbing layer 1.

The oxygen permeability of the ultraviolet absorbing layer 1 was 3,000 cc/(m$^2$×day×atm) or more, and the ultraviolet absorbing layer 1 did not have an oxygen blocking capability.

In addition, the transmittance of the ultraviolet absorbing layer 1 at a wavelength of 380 nm was measured using a spectrophotometer UV-3150 (manufactured by Shimadzu Corporation), and the transmittance was 9.5%.

<Production of Oxygen Blocking Layer 1>

One surface of the ultraviolet absorbing layer 1 was subjected to saponification treatment, and an oxygen blocking layer coating liquid 1 having the following composition was continuously applied to the saponification-treated surface using a wire bar. This was dried at 80° C. for 120 seconds to produce an oxygen blocking layer 1 having a film thickness of 0.8 μm on the ultraviolet absorbing layer 1.

In addition, the oxygen permeability of the oxygen blocking layer 1 was 100 cc/(m$^2$×day×atm).

(Oxygen Blocking Layer Coating Liquid 1)

- The following modified polyvinyl alcohol: 10 parts by mass
- Water: 370 parts by mass
- Methanol: 120 parts by mass
- Glutaraldehyde (crosslinking agent): 0.5 parts by mass Modified Polyvinyl Alcohol

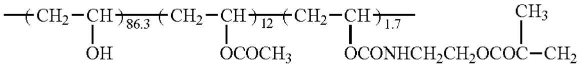

Modified polyvinyl alcohol

<Production of Decorative Layer 1>

The composition shown below was stirred and dissolved in a container held at 25° C. to prepare a decorative layer coating liquid 1.

(Decorative Layer Coating Liquid 1)

- Methyl ethyl ketone: 143.0 parts by mass
- Mixture of the following rod-like liquid crystal compound LC1: 100.0 parts by mass
- IRGACURE 127 (manufactured by BASF SE): 0.5 parts by mass
- Chiral agent A having the following structure: 2.0 parts by mass
- Chiral agent B having the following structure: 1.0 parts by mass
- Surfactant F1 having the following structure: 0.1 parts by mass Mixture of Rod-Like Liquid Crystal Compound LC1

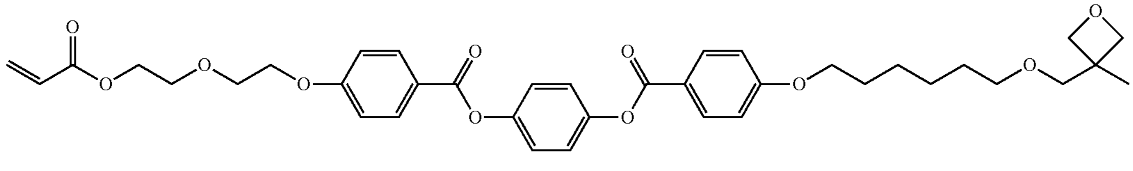

80%

-continued

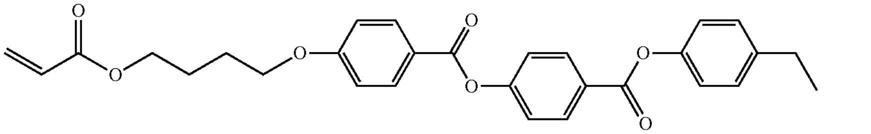

10%

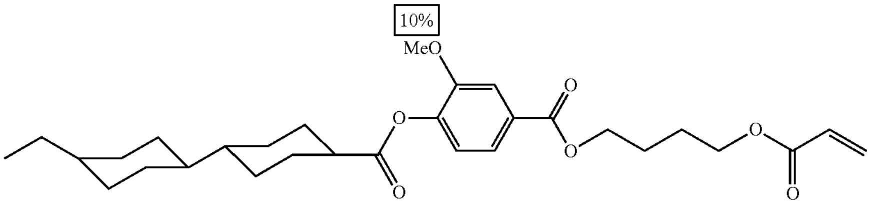

10%

The numerical values in the above formula are mass %. Me represents a methyl group.

Chiral agent A

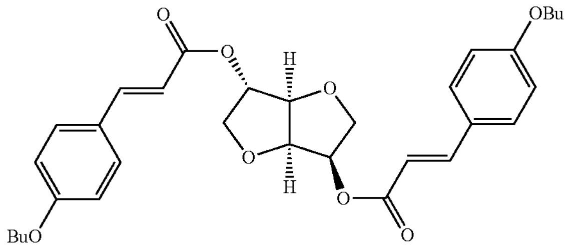

In the above formula, Bu represents a butyl group.

Chiral agent B

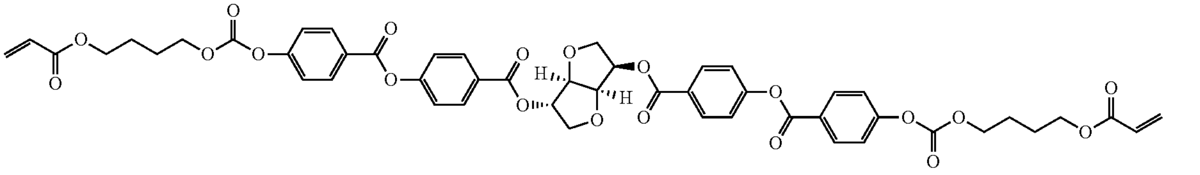

Surfactant F1

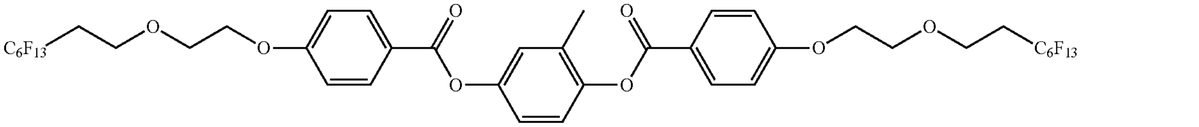

A 100 μm-thick polyethylene terephthalate (PET) film (COSMOSHINE A4100, manufactured by Toyobo Co., Ltd.) was prepared. This PET film has an easily adhesive layer on one surface thereof. The prepared decorative layer coating liquid 1 was continuously applied to a surface not having the easily adhesive layer of the PET film using a bar coater and dried at 100° C. for 60 seconds. Thereafter, the coating film was irradiated with light from a metal halide lamp at an irradiation dose of 72 mJ at 25° C. through an optical filter adjusted to transmit only light at a wavelength of 300 to 330 nm and an exposure mask having a wood-grain pattern, and further irradiated with light from a metal halide lamp at an irradiation dose of 300 mJ at 120° C. in a low-oxygen atmosphere (100 ppm or less) to form a decorative layer 1 having a wood-grain pattern with a film thickness of 4.2 μm.

When the cross-sectional scanning electron microscope (SEM) photograph of the decorative layer 1 was confirmed, in the liquid crystal layer, the interval of the stripe pattern derived from the helical pitch was changed in the film thickness direction, and the liquid crystal layer had a pitch gradient structure.

<Lamination of Decorative Layer 1>

The surface on the oxygen blocking layer 1 side of the laminate having the oxygen blocking layer 1 and the ultraviolet absorbing layer 1 and the surface on the decorative layer 1 side of the PET film having the decorative layer 1 were bonded to each other using a pressure-sensitive adhesive (SK2057, manufactured by Soken Chemical & Engineering Co., Ltd.). The PET film was then peeled off, thereby producing a laminate in which the decorative layer 1, the oxygen blocking layer 1, and the ultraviolet absorbing layer 1 were laminated.

<Formation of Laminate 1>

A λ/4 retardation layer was separately produced in the same manner as that of the λ/4 retardation film 1 described in JP2019-120949A. A laminate 1 of Example 1 was produced by bonding the λ/4 retardation layer to the surface on the decorative layer 1 side of the laminate having the decorative layer 1, the oxygen blocking layer 1, and the ultraviolet absorbing layer 1 produced above using a pressure-sensitive adhesive (SK2057, manufactured by Soken Chemical & Engineering Co., Ltd.).

Example 2

The oxygen blocking layer coating liquid 1 was continuously applied to a surface not having an easily adhesive layer of a 100 μm-thick polyethylene terephthalate (PET) film (COSMOSHINE A4100, manufactured by Toyobo Co., Ltd.) using a bar coater and dried at 80° C. for 120 seconds, thereby producing an oxygen blocking layer 2 on the PET film. Next, the decorative layer coating liquid 1 was continuously applied onto the oxygen blocking layer 2 using a bar coater and dried at 100° C. for 60 seconds. Thereafter, the coating film was irradiated with light from a metal halide lamp at an irradiation dose of 72 mJ at 25° C. through an optical filter adjusted to transmit only light at a wavelength of 300 to 330 nm and an exposure mask having a wood-grain pattern, and further irradiated with light from a metal halide lamp at an irradiation dose of 300 mJ at 120° C. in a low-oxygen atmosphere (100 ppm or less) to produce a laminate having the decorative layer 2 having a wood-grain pattern with a film thickness of 4.2 μm, the oxygen blocking layer 2, and the PET film.

When the cross-sectional scanning electron microscope (SEM) photograph of the decorative layer 2 was confirmed, in the liquid crystal layer, the interval of the stripe pattern derived from the helical pitch was changed in the film thickness direction, and the liquid crystal layer had a pitch gradient structure.

In addition, the oxygen permeability of the oxygen blocking layer 2 was 100 cc/(m$^2$×day×atm).

<Formation of Laminate 2>

A λ/4 retardation layer was separately produced in the same manner as that of the λ/4 retardation film 1 described in JP2019-120949A. The λ/4 retardation layer was bonded to the surface on the decorative layer 2 side of the laminate having the decorative layer 2 and the oxygen blocking layer 2 produced above using a pressure-sensitive adhesive (SK2057, manufactured by Soken Chemical & Engineering Co., Ltd.). Next, the PET film was peeled off from the oxygen blocking layer 2, and then the ultraviolet absorbing layer 1 was bonded to the peeled surface of the obtained laminate using a pressure-sensitive adhesive (SK2057, manufactured by Soken Chemical & Engineering Co., Ltd.) to produce a laminate 2 of Example 2.

Example 4

A laminate 4 of Example 4 was produced in the same manner, except that in the formation of the oxygen blocking layer of the laminate 1, the oxygen blocking layer coating liquid 1 was changed to an oxygen blocking layer coating liquid 4 described later, the film thickness was further adjusted, the drying temperature after the application was changed to 100° C., and after the drying, the coating film was irradiated with light from a metal halide lamp at an irradiation dose of 300 mJ at 80° C. in a low-oxygen atmosphere (100 ppm or less). The produced oxygen blocking layer 4 had a film thickness of 2.0 μm, and an oxygen permeability of 60 cc/(m$^2$×day×atm).

(Oxygen Blocking Layer Coating Liquid 4)

CEL2021P (manufactured by Daicel Corporation): 144 parts by mass

IRGACURE 819 (manufactured by BASF SE): 4 parts by mass

CPI-100P (50% propylene carbonate solution): 6 parts by mass

Surfactant F2 having the following structure: 0.3 parts by mass

Methyl ethyl ketone: 347 parts by mass

Surfactant F2

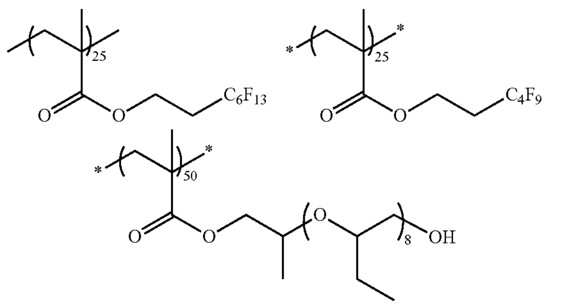

Example 5

A laminate 5 of Example 5 was produced in the same manner, except that the film thickness was adjusted in the formation of the oxygen blocking layer of the laminate 4. The produced oxygen blocking layer 5 had a film thickness of 4.0 μm and an oxygen permeability of 30 cc/(m$^2$×day×atm).

Example 6

A laminate 6 of Example 6 was produced in the same manner, except that in the formation of the oxygen blocking layer of the laminate 2, the oxygen blocking layer coating liquid 1 was changed to an oxygen blocking layer coating liquid 6 described later. The produced oxygen blocking layer 6 had a film thickness of 0.8 μm and an oxygen permeability of 5 cc/(m$^2$×day×atm).

(Oxygen Blocking Layer Coating Liquid 6)

The following modified polyvinyl alcohol: 10 parts by mass

Water: 343 parts by mass

Methanol: 147 parts by mass

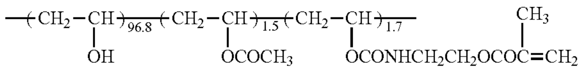

Example 7

A commercially available norbornene-based polymer film "ZEONOR ZF14" (manufactured by Optes Inc.) was prepared and used as the low-moisture permeable layer 7. The moisture permeability of the low-moisture permeable layer 7 at 40° C. and a relative humidity of 90% was 9 g/(m$^2$×day).

The surface on the oxygen blocking layer 1 side of the ultraviolet absorbing layer 1 having the oxygen blocking layer 1 and the low-moisture permeable layer 7 were bonded using a pressure-sensitive adhesive (SK2057, manufactured by Soken Chemical & Engineering Co., Ltd.). Further, the surface on the decorative layer side of the PET film having the decorative layer 1 was bonded onto the low-moisture permeable layer 7 using a pressure-sensitive adhesive (SK2057, manufactured by Soken Chemical & Engineering Co., Ltd.). The PET film was then peeled off, thereby producing a laminate having the decorative layer 1, the low-moisture permeable layer 7, the oxygen blocking layer 1, and the ultraviolet absorbing layer 1 in this order.

A laminate 7 of Example 7 was produced by further bonding a N/4 retardation layer produced in the same manner as in Example 1 to the surface on the decorative layer 1 side of the laminate having the decorative layer 1, the low-moisture permeable layer 7, the oxygen blocking layer 1, and the ultraviolet absorbing layer 1 produced above using a pressure-sensitive adhesive (SK2057, manufactured by Soken Chemical & Engineering Co., Ltd.).

Example 8

The ultraviolet absorbing layer 1 and the low-moisture permeable layer 7 were bonded to each other using a pressure-sensitive adhesive (SK2057, manufactured by Soken Chemical & Engineering Co., Ltd.), and then the surface on the low-moisture permeable layer 7 side of the laminate was subjected to corona treatment. An oxygen blocking layer 8 was formed on the low-moisture permeable layer 7 in the same manner as in the oxygen blocking layer 1.

The decorative layer 1 was bonded to the surface on the oxygen blocking layer side of the laminate having the ultraviolet absorbing layer 1, the low-moisture permeable layer 7, and the oxygen blocking layer 8 in the same manner as in Example 1. Further, the A/4 retardation layer was bonded onto the decorative layer 1 in the same manner as in Example 1 to produce a laminate 8 of Example 8.

Example 9

A low-moisture permeable layer 9 having a film thickness of 82 μm was produced in the same manner as in the production of the film 3 described in JP2014-206725A, except that a pellet was produced without adding RUVA-93 and CGL777MPA, and the film thickness was adjusted. The moisture permeability of the low-moisture permeable layer 9 at 40° C. and a relative humidity of 90% was 40 g/($m^2$× day).

The ultraviolet absorbing layer 1 and the low-moisture permeable layer 9 were bonded to each other using a pressure-sensitive adhesive (SK2057, manufactured by Soken Chemical & Engineering Co., Ltd.).

A laminate 9 of Example 9 was produced in the same manner as in the production of the laminate 2, except that the ultraviolet absorbing layer 1 was changed to a laminate having the ultraviolet absorbing layer 1 and the low-moisture permeable layer 9, and the surface on the low-moisture permeable layer 9 side of the laminate was bonded to the oxygen blocking layer 2.

Example 10

A laminate 10 of Example 10 was produced in the same manner as in the production of the laminate 9, except that the low-moisture permeable layer 9 was changed to the low-moisture permeable layer 7, and the oxygen blocking layer coating liquid 1 was changed to the oxygen blocking layer coating liquid 6 in the formation of the oxygen blocking layer.

Examples 3, 11, and 12

A polyvinyl alcohol (PVA) film having a thickness of 80 μm was dyed by being immersed in an iodine aqueous solution having an iodine concentration of 0.05 mass % at 30° C. for 60 seconds. Then, the film was longitudinally stretched five times its original length while being immersed in a boric acid aqueous solution having a boric acid concentration of 4 mass % for 60 seconds. The stretched film was then dried at 50° C. for 4 minutes to obtain a polarizer having a thickness of 20 μm.

A commercially available cellulose acylate-based film "TG40UL" (manufactured by Fujifilm Corporation) was prepared, and immersed in a sodium hydroxide aqueous solution at 1.5 mol/L at 55° C. Then, the obtained film was sufficiently washed with water to remove sodium hydroxide. Thereafter, the film was immersed in a dilute sulfuric acid aqueous solution at 0.005 mol/L and 35° ° C. for 1 minute, and then immersed in water to thoroughly wash away the dilute sulfuric acid aqueous solution. Finally, the sample was sufficiently dried at 120° C. to produce a polarizer protective film.

The polarizer protective film produced above was bonded to both surfaces of the polarizer produced above with a polyvinyl alcohol-based adhesive to produce a polarizing plate including the polarizer and the polarizer protective films disposed on both surfaces of the polarizer.

The polarizing plate produced above was bonded to the surface on the λ/4 retardation plate side of the laminate 2 using a pressure-sensitive adhesive (SK2057, manufactured by Soken Chemical & Engineering Co., Ltd.) to produce a laminate 3 of Example 3.

The polarizing plate produced above was bonded to the surface on the λ/4 retardation plate side of the laminate 9 using a pressure-sensitive adhesive (SK2057, manufactured by Soken Chemical & Engineering Co., Ltd.) to produce a laminate 11 of Example 11.

The polarizing plate produced as described above was bonded to the surface on the 4 retardation plate side of the laminate 10 using a pressure-sensitive adhesive (SK2057, manufactured by Soken Chemical & Engineering Co., Ltd.) to produce a laminate 12 of Example 12.

In the production of the laminates 3, 11, and 12, bonding was performed such that the angle formed by the optically anisotropic layer of the λ/4 retardation plate and the absorption axis of the polarizer was 45° in the clockwise direction.

Comparative Example 1

A laminate 13 of Comparative Example 1 was produced in the same manner as in the production of the laminate 1, except that the oxygen blocking layer 1 was not provided.

Comparative Example 2

A laminate 14 of Comparative Example 2 was produced in the same manner as in the production of the laminate 8, except that the oxygen blocking layer 1 was not provided.

EVALUATION (Evaluation of Light Resistance)

Each of the produced laminates was irradiated with xenon light at 60° C., 50% RH, and 150 mW/$m^2$ for 300 hours using a Super Xenon Weather Meter SX75 (manufactured by Suga Test Instruments Co., Ltd). Thereafter, the laminate before and after xenon irradiation was each bonded onto the surface on the viewing side of a polarizing plate of TH-55FZ950 (manufactured by Panasonic Corporation) using a pressure-sensitive adhesive (SK2057, manufactured by Soken Chemical & Engineering Co., Ltd.). In the power-off state, the decorative visibility of the laminate from the front was visually observed, and the light resistance of the laminate was evaluated based on the following criteria.

A: A tint difference is not visually recognized in the decoration (wood-grain pattern) before and after xenon irradiation. (OK)

B: A tint difference is very slightly visually recognized in the decoration (wood-grain pattern) before and after xenon irradiation, but is not noticeable at all. (OK)

C: A tint difference is visually recognized in the decoration (wood-grain pattern) before and after xenon irradiation, but is acceptable. (OK)

D: A tint difference of the decoration is significant before and after xenon irradiation, and the wood-grain pattern is unnatural and not acceptable. (NG)

(Evaluation of Display Transmittance)

The produced laminate was each bonded onto the surface on the viewing side of a polarizing plate of TH-55FZ950 (manufactured by Panasonic Corporation) using a pressure-sensitive adhesive (SK2057, manufactured by Soken Chemical & Engineering Co., Ltd.). In addition, in order to make the front-surface reflection conditions uniform, a laminate was separately prepared by bonding only the ultraviolet absorbing layer 1 onto the surface on the viewing side of a polarizing plate of TH-55FZ950 (manufactured by Panasonic Corporation) using a pressure-sensitive adhesive (SK2057, manufactured by Soken Chemical & Engineering Co., Ltd.). In the white display of the power-on state, front brightness was each measured using BM-5A (manufactured by Topcon Corporation). Then, display transmittance was calculated using the following equation and evaluated based on the following criteria.

Display transmittance=brightness of display to which produced laminate is bonded/brightness of display to which only ultraviolet absorbing layer 1 is bonded A: Display transmittance is 90% or more.

B: Display transmittance is less than 90% and 50% or more.

C: Display transmittance is less than 50%.

The results are shown in Table 1. In Table 1, the number in parentheses in the column of “Oxygen blocking layer” indicates the oxygen permeability (cc/($m^2$×day×atm)) measured in an environment of 25° C. and 50% RH. The number in parentheses in the column of “Low-moisture permeable layer” indicates the moisture permeability (g/($m^2$×day)) measured in an environment of 40° ° C. and 90% RH.

TABLE 1

| | | Example 1 | Example 2 | Example 3 | Example 4 | Example 5 | Example 6 | Example 7 |
|---|---|---|---|---|---|---|---|---|
| Laminate | Type<br>Configuration | Laminate 1<br>Ultraviolet absorbing layer 1<br>Oxygen blocking layer 1 (100)<br>Decorative layer 1<br>λ/4 retardation layer | Laminate 2<br>Ultraviolet absorbing layer 1<br>Oxygen blocking layer 2 (100)<br>Decorative layer 2<br>λ/4 retardation layer | Laminate 3<br>Ultraviolet absorbing layer 1<br>Oxygen blocking layer 2 (100)<br>Decorative layer 2<br>λ/4 retardation layer<br>Polarizer | Laminate 4<br>Ultraviolet absorbing layer 1<br>Oxygen blocking layer 4 (60)<br>Decorative layer 1<br>λ/4 retardation layer | Laminate 5<br>Ultraviolet absorbing layer 1<br>Oxygen blocking layer 5 (30)<br>Decorative layer 1<br>λ/4 retardation layer | Laminate 6<br>Ultraviolet absorbing layer 1<br>Oxygen blocking layer 6 (5)<br>Decorative layer 2<br>λ/4 retardation layer | Laminate 7<br>Ultraviolet absorbing layer 1<br>Oxygen blocking layer 1 (100)<br>Low-moisture permeable layer 7 (9)<br>Decorative layer 1<br>λ/4 retardation layer |
| Evaluation | Display transmittance | A | A | A | A | A | A | A |
| | Light resistance | C | C | C | C | B | A | C |
| | | Example 8 | Example 9 | Example 10 | Example 11 | Example 12 | Comparative Example 1 | Comparative Example 2 |
| Laminate | Type<br>Configuration | Laminate 8<br>Ultraviolet absorbing layer 1<br>Low-moisture permeable layer 7 (9)<br>Oxygen blocking layer 1 (100)<br>Decorative layer 1<br>λ/4 retardation layer | Laminate 9<br>Ultraviolet absorbing layer 1<br>Low-moisture permeable layer 9 (40)<br>Oxygen blocking layer 2 (100)<br>Decorative layer 2<br>λ/4 retardation layer | Laminate 10<br>Ultraviolet absorbing layer 1<br>Low-moisture permeable layer 7 (9)<br>Oxygen blocking layer 6 (5)<br>Decorative layer 2<br>λ/4 retardation layer | Laminate 11<br>Ultraviolet absorbing layer 1<br>Low-moisture permeable layer 9 (40)<br>Oxygen blocking layer 2 (100)<br>Decorative layer 2<br>λ/4 retardation layer<br>Polarizer | Laminate 12<br>Ultraviolet absorbing layer 1<br>Low-moisture permeable layer 7 (9)<br>Oxygen blocking layer 6 (5)<br>Decorative layer 2<br>λ/4 retardation layer<br>Polarizer | Laminate 13<br>Ultraviolet absorbing layer 1<br>Decorative layer 1<br>λ/4 retardation layer | Laminate 14<br>Ultraviolet absorbing layer 1<br>Low-moisture permeable layer 7 (9)<br>Decorative layer 1<br>λ/4 retardation layer |

TABLE 1-continued

| | | | | | | | | |
|---|---|---|---|---|---|---|---|---|
| Evaluation | Display transmittance | A | A | A | A | A | A | A |
| | Light resistance | B | B | A | B | A | D | D |

Table 1 shows that the laminates of Examples have excellent light resistance as compared with Comparative Examples. Table 1 also shows that the display transmittance of the laminates of Examples was as high as 90% or more and was not decreased as compared with Comparative Examples.

In addition, from the comparison of Examples 1, 7, and 8 and the comparison of Examples 2, 9, and 10, it is found that the light resistance is further improved by providing the low-moisture permeable layer at a position closer to the viewing side than the oxygen blocking layer.

In addition, from the comparison of Examples 1 and 4 to 6, it is found that the oxygen permeability of the oxygen blocking layer is preferably 30 cc/($m^2$×day×atm) or less and more preferably 5 cc/($m^2$×day×atm) or less.

Macbook Pro (manufactured by Apple Inc.) was disassembled, and the antireflection (AR) film was peeled off from the viewing side of the polarizing plate. Further, a wood-grain tactile film was produced with reference to the method described in Example 1 of JP2012-218284A.

The AR film and the tactile film were bonded to the surface of each laminate of Examples and Comparative Examples, and the same evaluation as described above was performed. As a result, the same results as in Table 1 were obtained.

The effects of the present invention are apparent from the above.

EXPLANATION OF REFERENCES

10*a* to 10*d*: laminate
12: λ/4 retardation layer
14: decorative layer
16: oxygen blocking layer
18: ultraviolet absorbing layer
20: polarizer
22: low-moisture permeable layer
30: substrate
32, 34, 34*a*, 34*b*: cholesteric liquid crystal layer
100*a* to 100*d*: display device
102: display element

What is claimed is:

1. A laminate comprising, in the following order:
a λ/4 retardation layer;
a decorative layer including a cholesteric liquid crystal layer; and
an ultraviolet absorbing layer,
wherein the laminate includes an oxygen blocking layer on a side of the ultraviolet absorbing layer with respect to the decorative layer.

2. The laminate according to claim 1,
wherein the oxygen blocking layer contains a polyvinyl alcohol-based resin or a polyethylene vinyl alcohol-based resin.

3. The laminate according to claim 2,
wherein the polyvinyl alcohol-based resin and the polyethylene vinyl alcohol-based resin have a degree of saponification of 83% or more.

4. The laminate according to claim 2,
wherein the ultraviolet absorbing layer has a transmittance of less than 10% at a wavelength of 380 nm.

5. The laminate according to claim 2, further comprising:
a low-moisture permeable layer on the side of the ultraviolet absorbing layer with respect to the decorative layer,
wherein the low-moisture permeable layer has a moisture permeability of 40 g/($m^2$×day) or less at a temperature of 40° C. and a relative humidity of 90%, and the low-moisture permeable layer is provided at a position farther from the decorative layer than the oxygen blocking layer.

6. The laminate according to claim 2, further comprising:
a polarizer on the λ/4 retardation layer on a side opposite to the decorative layer.

7. The laminate according to claim 2, further comprising:
at least one of an antireflection layer, a non-glossy layer, or a tactile sensation imparting layer on an outermost surface of the laminate.

8. A display device comprising:
a display element; and
the laminate according to claim 2 disposed on a side of a display surface of the display element.

9. The display device according to claim 8, which is a liquid crystal display device or an electroluminescent display device.

10. An automobile comprising:
the laminate according to claim 2.

11. The laminate according to claim 1,
wherein the ultraviolet absorbing layer has a transmittance of less than 10% at a wavelength of 380 nm.

12. The laminate according to claim 1, further comprising:
a low-moisture permeable layer on the side of the ultraviolet absorbing layer with respect to the decorative layer,
wherein the low-moisture permeable layer has a moisture permeability of 40 g/($m^2$×day) or less at a temperature of 40° C. and a relative humidity of 90%, and the low-moisture permeable layer is provided at a position farther from the decorative layer than the oxygen blocking layer.

13. The laminate according to claim 1, further comprising:
a polarizer on the λ/4 retardation layer on a side opposite to the decorative layer.

14. The laminate according to claim 1, further comprising:
at least one of an antireflection layer, a non-glossy layer, or a tactile sensation imparting layer on an outermost surface of the laminate.

15. A display device comprising:
a display element; and
the laminate according to claim 1 disposed on a side of a display surface of the display element.

16. The display device according to claim 15, which is a liquid crystal display device or an electroluminescent display device.

17. An automobile comprising:
the display device according to claim 15.

18. A portable electronic device comprising:
the display device according to claim 15.

19. An automobile comprising:
the laminate according to claim 1.

20. A portable electronic device comprising:
the laminate according to claim 1.

* * * * *